United States Patent
Masoud

(10) Patent No.: US 12,416,910 B2
(45) Date of Patent: Sep. 16, 2025

(54) FREQUENCY DOMAIN-EMBEDDED, STATE SPACE METHOD AND SYSTEM FOR DECENTRALIZED CONTROL OF COUPLED PLANTS

(71) Applicant: KING FAHD UNIVERSITY OF PETROLEUM AND MINERALS, Dhahran (SA)

(72) Inventor: Ahmad A. Masoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 499 days.

(21) Appl. No.: 17/900,251

(22) Filed: Aug. 31, 2022

(65) Prior Publication Data

US 2024/0077853 A1    Mar. 7, 2024

(51) Int. Cl.
G05B 19/418    (2006.01)
G05B 13/04    (2006.01)

(52) U.S. Cl.
CPC ..... G05B 19/41845 (2013.01); G05B 13/042 (2013.01); G05B 2219/32053 (2013.01); G05B 2219/37534 (2013.01)

(58) Field of Classification Search
CPC .......... G05B 19/41845; G05B 13/042
See application file for complete search history.

(56) References Cited

U.S. PATENT DOCUMENTS

2011/0074330 A1*  3/2011  Ellis ............... G05B 13/042
318/561

FOREIGN PATENT DOCUMENTS

JP          6978964 B2   12/2021
WO   WO 2011/040998 A1   4/2011

OTHER PUBLICATIONS

Khosravi et al., Safety-Aware Cascade Controller Tuning Using Constrained Bayesian Optimization, Aug. 11, 2021, arXiv:2010.15211v2, 9 pages (Year: 2021).*
Fnaiech et al., Model-Free Controller Tuning Based on DFT Processing: Application to Induction Motor Drives, Dec. 2014, IEEE Journal of Emerging and Selected Topics in Power Electronics, vol. 2, No. 4, pp. 1013-1022 (Year: 2014).*

(Continued)

*Primary Examiner* — Howard Cortes
(74) *Attorney, Agent, or Firm* — Oblon, McClelland, Maier &Neustadt, L.L.P.

(57) ABSTRACT

A decentralized control of decoupled plants which each include a motor and a load. A controller is connected in series with each decoupled plant. An adder is configured to receive a set point signal and a negative feedback signal from the plant output and generate an error signal. Each controller receives a set of tuning parameters, modifies the error signal based on a tuning parameter space vector and generates drive signals which actuate the motor, operate the load, and generate the plant output in accordance with a frequency domain assessment function. A compensator samples the error signals and the plant outputs, Fourier transforms the error signals, generates the tuning parameter space vector, based on a frequency domain assessment function, obtains the set of tuning parameters from the tuning parameter space vector, and transmits the frequency domain assessment function and the set of tuning parameters to each controller.

13 Claims, 23 Drawing Sheets

(56) References Cited

OTHER PUBLICATIONS

Serdar Ethem Hamamci, "An Algorithm for Stabilization of Fractional-Order Time Delay Systems Using Fractional-Order PID Controllers", IEEE Transactions on Automatic Control, vol. 52, Issue 10, Oct. 15, 2007, pp. 1964-1969.

T. John Koo, et al., "A Computational Approach for Estimating Stability Regions", Proceedings of The 2006 IEEE Conference on Computer Aided Control Systems Design, WeA02.4, Oct. 4-6, 2006, pp. 62-68.

Tingshu Hy, et al., "Absolute Stability With a Generalized Sector Condition", IEEE Transactions on Automatic Control, vol. 49, No. 4, Apr. 2004, pp. 535-548.

Mikhail Lipkovich, et al., "Equivalence of MIMO Circle Criterion to Existence of Quadratic Lyapunov Function", IEEE Transactions on Automatic Control, vol. 61, Issue 7, Oct. 6, 2015, pp. 1895-1899.

Gabriele Schmitt, "Frequency domain evaluation of circle criterion, Popov criterion and off-axis circle criterion in the MIMO case", International Journal of Control, vol. 72, No. 14, 1999, pp. 1299-1309.

Antonio Tornambé, et al., "A decentralized controller for the robust stabilization of a class of MIMO linear systems", Systems & Control Letters, vol. 18, 1992, pp. 383-390.

Getachew K. Befekadu, et al., "On the reliable decentralised stabilisation of $n$ MIMO systems", International Journal of Control, vol. 87, No. 8, 2014, pp. 1565-1572.

\* cited by examiner

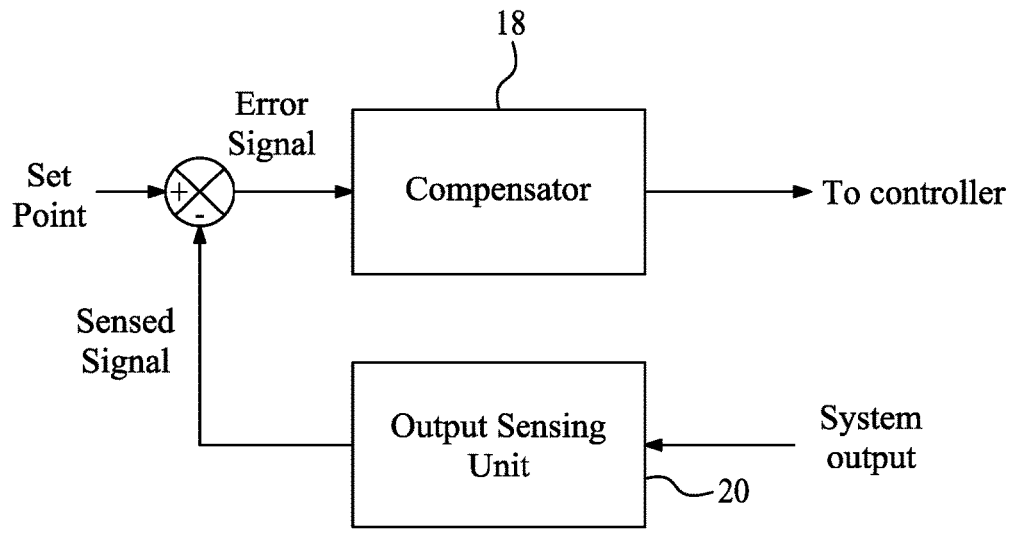
*FIG. 1C*
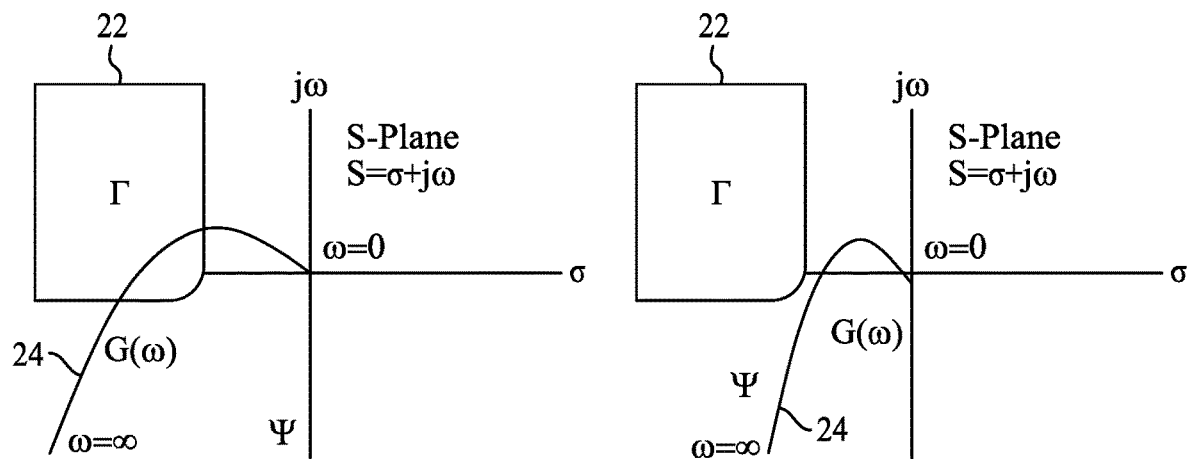
*FIG. 1D(a)*     *FIG. 1D(b)*

FREQUENCY DOMAIN-EMBEDDED, STATE SPACE METHOD AND SYSTEM FOR DECENTRALIZED CONTROL OF COUPLED PLANTS

BACKGROUND

Technical Field

The present disclosure is directed to auto-tuning of compensators in industrial plants, and more particularly relates to a frequency domain-embedded, state space method and system for decentralized control of coupled plants.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Industrial plants, such as a petroleum plant, gas plant, water treatment plant, chemical production plant and the like, have equipment components and smaller subsystems coupled directly or indirectly to one another to achieve a desired goal of the plant. In many instances, the subsystems have interdependent coupling with one another. Any variations in dynamic response, such as an actuator saturation nonlinearity, a time delay, and the like, of one of the subsystems may affect the other subsystems. The actuator saturation nonlinearity, the time delay, and the like may occur due to compliance issues, backlash, friction and such disturbances in components of the subsystem. Accordingly, the performance of one subsystem affects, directly or indirectly, the other subsystems. An example of the conventional industrial plant is shown in FIG. 1A.

FIG. 1A illustrates a schematic diagram of a conventional plant 10 including a centralized controller 4. The plant 10 includes a plurality of subplants such as subplant 2-1 and subplant 2-2. For brevity, only subplant 2-1 and subplant 2-2 are shown. The plant 10 may have less than two or more than two subplants. The plurality of subplants 2-1, 2-2 may have internal coupling, and coupling and interdependencies 6 as a result of the internal coupling. The centralized controller 4 may be a combination of a plurality of individual controllers such as controllers 4-1 to 4-4. Each controller 4-1 to 4-4 connects to one of the corresponding subplants 2-1, 2-2. For example, controller 4-1 is connected to subplant 2-1 and subplant 2-2. The centralized controller 4 receives feedback or output from each subplant(s). For example, the controller 4-1 and the controller 4-2 receive feedback from Plant-1 of subplant 2-1. The centralized controller 4 communicates with each subplant when receiving the plant output (also referred to as feedback) from each interdependent subplant 2-1, 2-2 of the plant 10, and generates a tuning command for each subplant 2-1, 2-2. The centralized controller 4 incorporates dynamic variations in each of the subcontrollers of the interdependent subplants 2-1, 2-2 in generating the tuning command for each subplant 2-1, 2-2. However, there is a disadvantage in the coupled subplants or a plant having a centralized controller 4. As the number of subplants increases in the plant 10, intercommunication of the subplants 2 with the centralized controller 4 increases by manifolds. For example, if a plant has 10 subplants, the centralized controller may have 100×100=10,000 intercommunication signals to handle. This increase in subplants and the corresponding increase in the intercommunications reduces system 10 robustness and increases the load on the centralized controller. For example, should one or more channels of multiple communication channels malfunction, get interrupted or be tampered with, the plant 10 slows down due to the dependencies among the subplants. Further, the slowdown could lead to a non-negligible possibility of not achieving the desired goal of the plant.

To reduce the load on the centralized controller, a decentralized controller was introduced in conventional plants. However, stabilization of each decentralized controller that experiences dynamic responses due to time delays and actuator saturation in the subplants is challenging to design. These dynamic responses affect the stability criteria of each controller such that the plant may respond arbitrarily and produce undesired outputs.

In many instances, the frequency domain is used for analyzing stability criteria of the decentralized controller. The stability criteria are traced to a specific region in the frequency domain where a frequency response of the subplant is stable. However, the system frequency response is not addressed in determining the adjustment of tuning parameters of each decentralized controller in the above mentioned references.

Accordingly, the present disclosure describes a system and methods which determine tuning parameters for each decentralized controller based upon a stability criteria of the plant system in the frequency domain.

SUMMARY

In an exemplary embodiment, a system for decentralized control of decoupled plants is disclosed. The system includes N decoupled plants. Each plant includes at least a motor and a load. The system further includes N controllers. A controller is connected in series with a decoupled plant. Each controller$_i$, for i=1, 2, . . . , N, includes an adder, $A_i$, having a first input configured receive a set point signal, $S_{Pi}$ with frequency, $\omega_i$, and a second input configured to receive a negative feedback signal from at a respective plant output, $PO_i$. The adder is configured to add the set point signal, $SP_i$, to the negative feedback signal, and generate an error signal, $E_i$. The system further includes a controller interface configured to receive a set of L tuning parameters. The system further includes a controller circuitry including a non-transitory computer readable medium including program instructions and one or more processors configured to use the program instructions to modify the error signal, a frequency domain assessment function, $Q(\omega, \Lambda)$ and a set of L tuning parameters and generate drive signals which actuate the motor, operate the load and generate the plant output, $PO_i$. The system further includes a compensator connected to the decoupled plants. The compensator is configured to: sample the error signals, $E_i$, and the plant outputs, $PO_i$, perform a Fourier transform of the error signals, $E_i$, to transform the error signals, $E_i$, to a frequency domain, generate the tuning parameter space vector, $\Lambda$, given by $\Lambda = [\gamma_1\ \gamma_2\ \ldots\ \gamma_L]^T$, where $\gamma_i$ represents an $i^{th}$ tuning parameter and T represents a transpose, based on a frequency domain assessment function, $Q(\omega, \Lambda)$, where $Q(\omega, \Lambda)$ is a subset of an admissible region, $\Psi$, in the frequency domain, obtain the set of L tuning parameters from the tuning parameter space vector, $\Lambda$; and transmit the frequency domain assessment function, $Q(\omega, \Lambda)$ and the set of L tuning parameters to each controller interface of each plant.

In another exemplary embodiment, a method for determining controller tuning parameters for a system of decoupled plant controllers is disclosed. The method includes, for each decoupled plant controller, receiving, by a first input of an adder $A_i$ in series with a plant controller, $CT_i$, for i=1, 2, . . . , N, a set point signal, $SP_i$, having signal frequency, $\omega_i$. The method also includes receiving, by a second input of the adder Ai, a negative feedback signal of a plant output, $PO_i$. The method further includes generating an error signal $E_i$ by adding, by the adder $A_i$, the set point signal, $SP_i$, to the negative feedback signal. The method further includes receiving, at an interface of each controller, $CT_i$, a set of L tuning parameters. The method further includes receiving, at the interface of each controller, $CT_i$, a frequency domain assessment function, $Q(\omega, \Lambda)$. The method further includes performing, by a controller circuitry located in each controller $CT_i$, the steps of modifying the error signal, $E_i$, based on the tuning parameter space vector $\Lambda$, generating drive signals, transmitting the drive signals to a plant $B_i$, connected in series with the controller $CT_i$, actuating, with the drive signals, a motor, $G_i$, located within the plant, $B_i$, operating, by the motor, $G_i$, a load, $D_i$ and generating the plant output, $PO_i$. The method further includes sampling, by an adder, $A_s$, connected to the system of decoupled plant controllers, the set point signals, $SP_i$, from each plant, for each i=1 to N, and the plant outputs, $PO_i$. The method further includes performing, by a compensator connected to the adder, $A_s$, a Fourier transform of the set point signals, $SP_i$, which transforms the set point signals, $SP_i$, to a frequency domain. The method further includes receiving, by a compensator interface of the compensator, a frequency domain assessment function, $Q(\omega, \Lambda)$, where $Q(\omega, \Lambda)$ is a subset of an admissible region, $\Psi$, in the frequency domain. The method further includes generating, by the compensator, a tuning parameter space vector, $\Lambda$, given by $\Lambda = [\Upsilon_1 \ \Upsilon_2 \ \ldots \ \Upsilon_L]^T$, where $\Upsilon_i$ represents an $i^{th}$ tuning parameter and T represents a transpose, based on the frequency domain assessment function, $Q(\omega, \Lambda)$. The method further includes obtaining the L tuning parameters from the tuning parameter space vector, $\Lambda$. The method further includes transmitting, by a transmitter connected to the compensator, the frequency domain assessment function, $Q(\omega, \Lambda)$ and the L tuning parameters to each controller interface of each controller, $CT_i$, of the system of decoupled plant controllers.

In another exemplary embodiment, a non-transitory computer readable medium having instructions stored therein that, when executed by one or more processors, cause the one or more processors to perform a method of determining controller tuning parameters for a system of decoupled plant controllers each connected to a plant. The method includes sampling, by an adder, $A_s$, connected to the system of decoupled plant controllers, a set point signals, $SP_i$, from each plant and a set of plant outputs, $PO_i$, for each i=1 to N. The method further includes performing a Fourier transform of the set point signals, $SP_i$, which transforms the set point signals, $SP_i$, to a frequency domain. The method further includes receiving, at a compensator interface, a frequency domain assessment function, $Q(\omega, \Lambda)$, where $Q(\omega, \Lambda)$ is a subset of an admissible region, $\Psi$, in the frequency domain. The method further includes generating a tuning parameter space vector, $\Lambda$, given by $\Lambda = [\Upsilon_1 \ \Upsilon_2 \ \ldots \ \Upsilon_L]^T$, where $\Upsilon_i$ represents an $i^{th}$ tuning parameter and T represents a transpose, based on the frequency domain assessment function, $Q(\omega, \Lambda)$. The method further includes obtaining the L tuning parameters from the tuning parameter space vector, $\Lambda$. The method further includes transmitting, by a transmitter connected to the compensator, the frequency domain assessment function, $Q(\omega, \Lambda)$ and the L tuning parameters to each controller of the system of decoupled plant controllers. Each controller of the system of decoupled plant controllers is further configured for receiving the frequency domain assessment function, $Q(\omega, \Lambda)$ and the L tuning parameters, modifying a feedback error signal based on the tuning parameter space vector, $\Lambda$, generating drive signals based on the frequency domain assessment function, $Q(\omega, \Lambda)$ and the L tuning parameters for transmitting the drive signals to a plant connected in series with the controller, actuating, with the drive signals, a motor located within the plant, operating, by the motor, a load, and generating the plant output, $PO_i$.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1C illustrates a schematic diagram of an exemplary system for defining stability criteria, according to certain embodiments.

FIG. 1D(a) illustrates an open loop frequency response which violates Nyquist stability criteria, according to certain embodiments.

FIG. 1D(b) illustrates an open loop frequency response which meets Nyquist stability criteria, according to certain embodiments.

FIG. 4B(b) illustrates a graphical representation of a dead zone condition in the plant, according to certain embodiments.

DETAILED DESCRIPTION

Figure 1A:
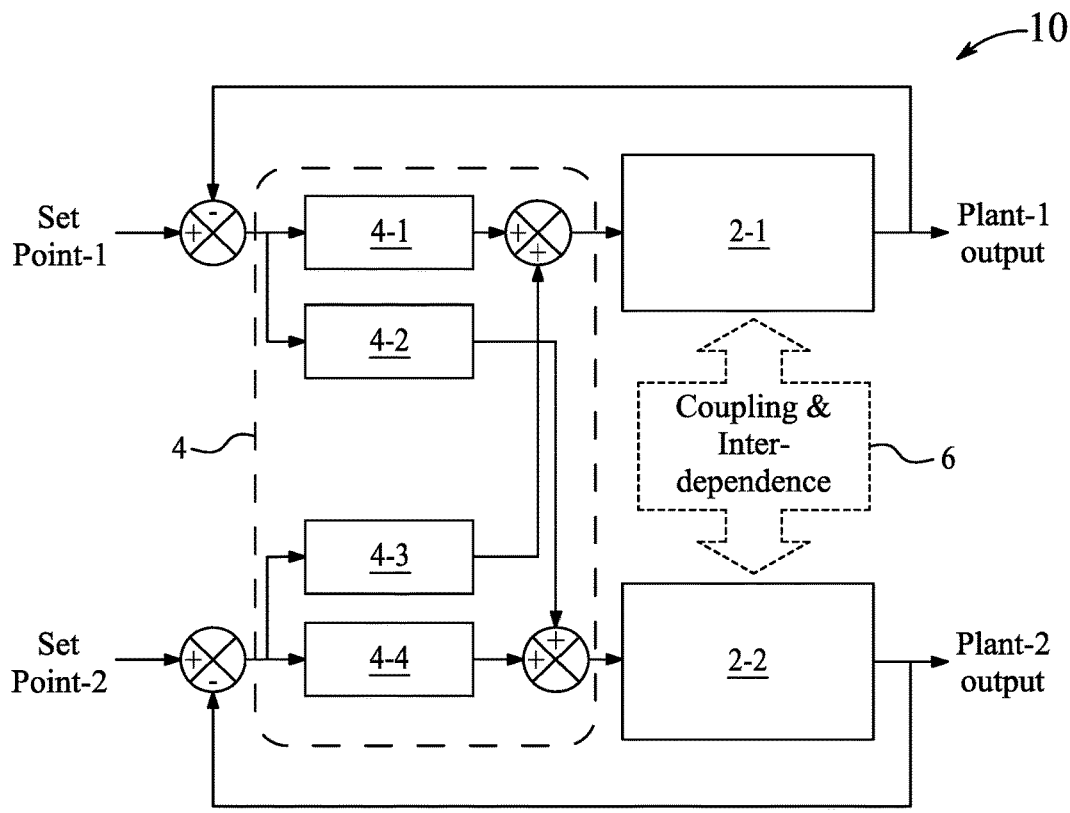
FIG. 1A illustrates a schematic diagram of a plant including a centralized controller.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and methods for a frequency domain-embedded, state space approach for decentralized control of coupled plants. The system uses the state space approach and frequency domain approach for stabilizing a plant based on stability criteria. The state space approach confines plant responses in the frequency domain to avoid an arbitrary region in the frequency domain which leads to undesired outputs, thereby stabilizing the system. A controller is configured to convert a geometry produced by a frequency domain stability criterion into a stabilized control action by reshaping an error signal through a compensator and an analysis is performed to determine whether the frequency response of the system complies with the stability criterion. The stability criterion is governed by a scaler function. The scaler function measures a length of the intersection the frequency response makes with regions of non-permissible frequency domain/virtual domain regions. If the frequency response of the system intersects at any point or passes through the non-permissible frequency domain regions (hereinafter referred to as virtual region $\Gamma$), the system is said to have violated the stability criteria. In contrast, when the point of intersection of the frequency response of the system does not intersect within the virtual region $\Gamma$, the system is said to be stable. Components of the state vector are samples of the system's frequency response. The samples may be selected such that the state vector represents a condition of the frequency response from the set of samples. Elements of the input vector are parameters used to tune the compensator which shapes a spectrum of the system. Accordingly, the compensator forces the frequency response to comply with desired stability/performance conditions that would drive a state of an embedded state space system from any initial conditions to a zero state where the frequency response does not intersect any virtual region $\Gamma$. In such conditions, even if a plant experiences a time delay at its output or an actuator saturates, the compensator may provide controlled or modified tuning parameters to the plant that yields a stable output from the plant.

Figure 1B:
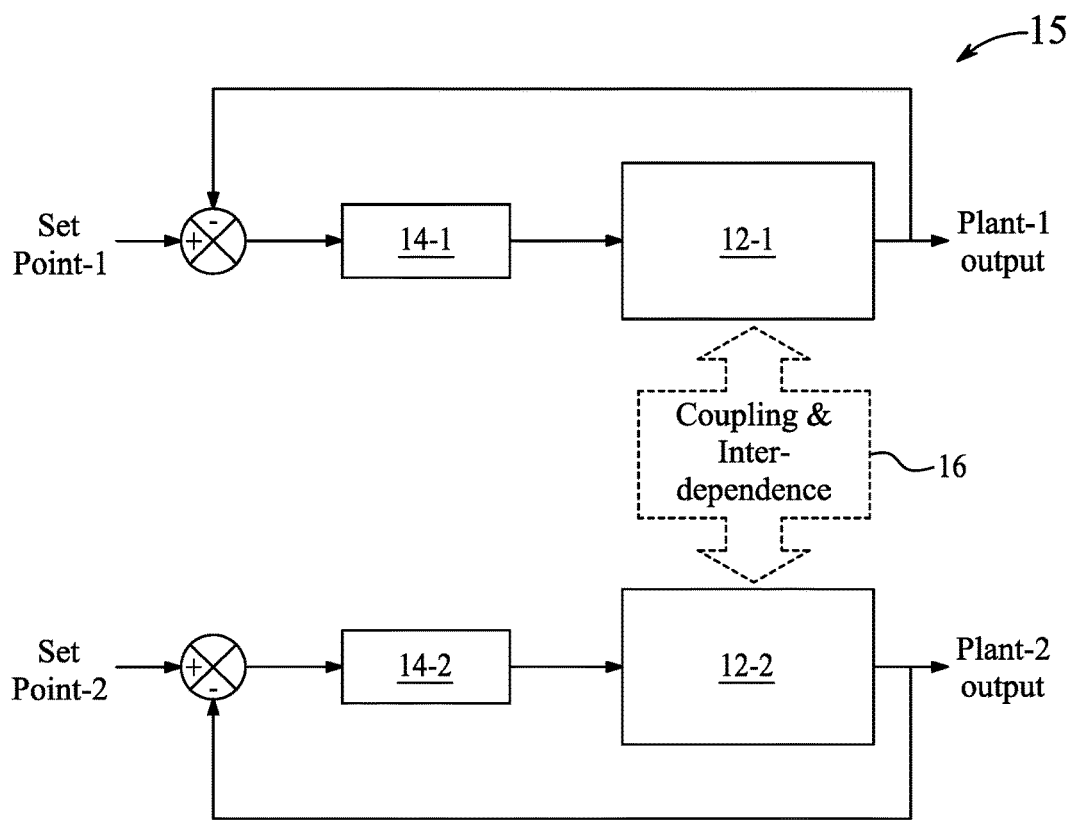
FIG. 1B illustrates a schematic diagram of a plant including decentralized controllers, according to certain embodiments.

FIG. 1B illustrates a schematic diagram of a plant 15 having decentralized controllers, that is a controller 14-1 and a controller 14-2. Having decentralized controllers reduces or substantially eliminates the effect of malfunction or tampering with channels which was a possibility in the centralized controller 4 of FIG. 1A. As illustrated in FIG. 1B, each subplant is connected with a dedicated decentralized controller. For example, the subplant 12-1 is connected to the controller 14-1, and the subplant 12-2 is connected to the controller 14-2. The decentralized plant 15 may or may not have coupling and interdependencies 16 between the subplant 12-1 and the subplant 12-2. The number of communication channels that would be required to communicate between each subplant increases rapidly as more subplants are added. Stabilization of each decentralized controller 14-1, 14-2 that experiences dynamic responses due to time delays and actuator saturation in the subplants 12-1 or 12-2 is needed to avoid instability in the each decentralized controller response. These unstable responses affect the stability criteria of each controller 14-1, 14-2 such that the plant 15 may respond arbitrarily and produce undesired outputs.

The stability criteria may be described by considering an example of a compensator 18 in a forward path and an output sensing unit 20 in a feedback path, as shown in FIG. 1C. A time-domain transfer g(t) of the entire system may be transformed into a Laplace domain or a frequency domain G(S) by taking a Laplace transform of g(t). A frequency response G($\omega$) of the system may be calculated by transforming a plurality of frequency values '$\omega$' into G(S). When an open-loop transfer function of the system is computed, the feedback path may be assumed to be open. The open-loop frequency response of the system G($\omega$) can be plotted to a complex S plane using a Nyquist stability criterion to identify the stability of the system 15. If the open-loop frequency response of the system G($\omega$) is such that it crosses a defined region, also known as a virtual region $\Gamma$ 22, an output from the system 15 is said to be unstable.

The virtual region $\Gamma$ 22 is shown in FIG. 1D(a). A curve 24 represents the open loop frequency response of the system G($\omega$) that crosses the virtual region $\Gamma$ 22. Passing through the virtual region $\Gamma$ 22 indicates that the system 15 has an unstable response at a range where the curve 24 overlaps the virtual region $\gamma$ 22. However, if the open loop frequency response 24 of the system G($\omega$) does not overlap the virtual region $\gamma$ 22, as shown in FIG. 1D(b), the system 15 is said to be stable. In this case, the curve 24 does not overlap the virtual region $\Gamma$ 22 and the system 15 remains stable for all frequencies. Referring back to FIG. 1B, the frequency response of the plant 24 should avoid the virtual region $\Gamma$ 22 in the frequency domain where the frequency response of the plants 12-1 or 12-2 are unstable.

Figure 1E:
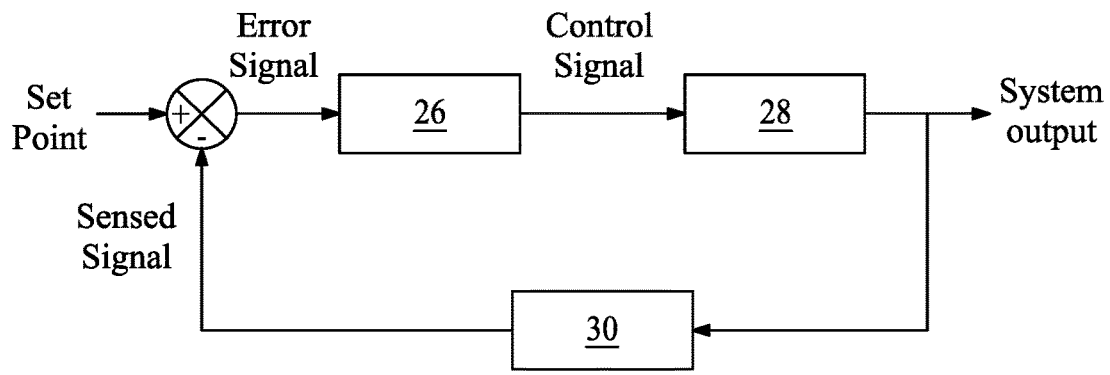
FIG. 1E is a block diagram of a compensator for tuning parameter modification, according to certain embodiments.

To elaborate on the modification of the tuning parameters, an example is provided. Consider a system that includes a compensator 26, a plant 28 and an output sensing unit 30, as shown in FIG. 1E. The compensator 26 and the plant 28 are cascaded in series, whereas the output sensing unit 30 is connected as a feedback unit that provides the system output as a negative feedback to the compensator 26 through an adder. A set point signal is applied to the system through the adder. The compensator 26 receives an error signal e(t) which is a difference between the set point signal and the output from the output sensing unit 30. The compensator 26 is a dynamical system that relates its output u(t) and the error signal e(t) in the Laplace domain as below:

$$U(S)(S, P1, Z1, P2, Z2) = \frac{(S+Z1)}{(S+P1)} \cdot \frac{(S+Z2)}{(S+P2)} \cdots \frac{S+ZM}{S+PM} \cdot E(S),$$

where E(S) is a Laplace transform of the error signal e(t) received at the input of the compensator 26, and the Z's and P's are zeros and poles respectively representing the tuning parameters (variables) of the compensator 26.

The values of the poles and the zeros determine the stability of the system. Initially, when the plant 28 does not experience actuator saturation and delay, the values of the poles and zeros may be of defined values. When the plant 28 experiences an actuator saturation or a delay, the compensator 26 shapes the error signal. Shaping the error signal includes modifying the tuning parameters by a calculation of new values of the poles P and zeros Z of the compensator 26 such that the frequency response of the compensator 26 and the plant 28 satisfies the frequency response stability criterion.

Figure 1F:
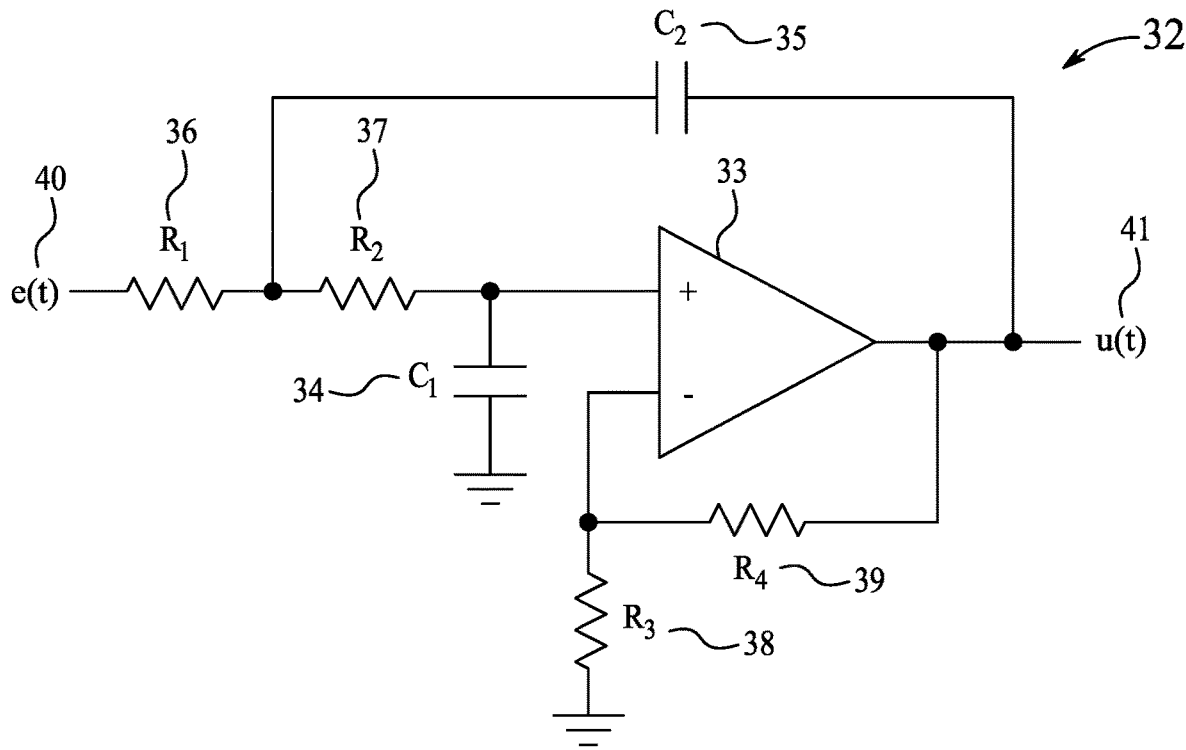
FIG. 1F illustrates an equivalent electric circuit representing the compensator, according to certain embodiments.

Based on the modified tuning parameters, the compensator 26 generates a control signal that leads the plant 28 to become stable. In some examples, the compensator 26 may be realized by synthesizing an equivalent electric circuit 32 or a digital circuit using the compensator's modified tuning parameters. In an example, the electric circuit 32 may be as shown in FIG. 1F. FIG. 1F illustrates an operational amplifier 33. The operational amplifier 33 is a high-gain electronic voltage amplifier with a differential input and at least one single-ended output. One of the differential input receives error e(t) 40 through $R_1$ 36 and $R_2$ 37 connected in series. A capacitor $C_1$ 34 is coupled to the non-inverting input and the ground. The inverting input is coupled to the ground through resistor $R_3$ 38. The operational amplifier 32 has a feedback loop, which feedsback the output of the operational amplifier 33, u(t) 41, through a capacitor $C_2$ 35. As a feedback path, the feedback u(t) 41 gets delayed with respect to e(t) 40. The delay may affect the stability criteria of operational amplifier 33. Synthesizing the operational amplifier 33 includes computing an actual value of the resistance of the resistors $R_1$ 36 and $R_2$ 37 and the capacitance of the capacitor $C_2$ 35 of the electric circuit 32 based on the modified tuning parameters that would cause the electric circuit 32 to behave as the compensator 26 with the modified poles and the modified zeros. In other words, the resistance and the capacitance values of the electric circuit 32 are changed such that the poles and zeros of the electric circuit 32 lie in a stable or permitted region of the frequency domain. Upon receiving modified tuning parameters, the plant 28 becomes stable as the system satisfies the stability criteria. Changing the poles and zeroes includes delaying the output u(t) as shown in FIG. 1F.

Figure 1G:
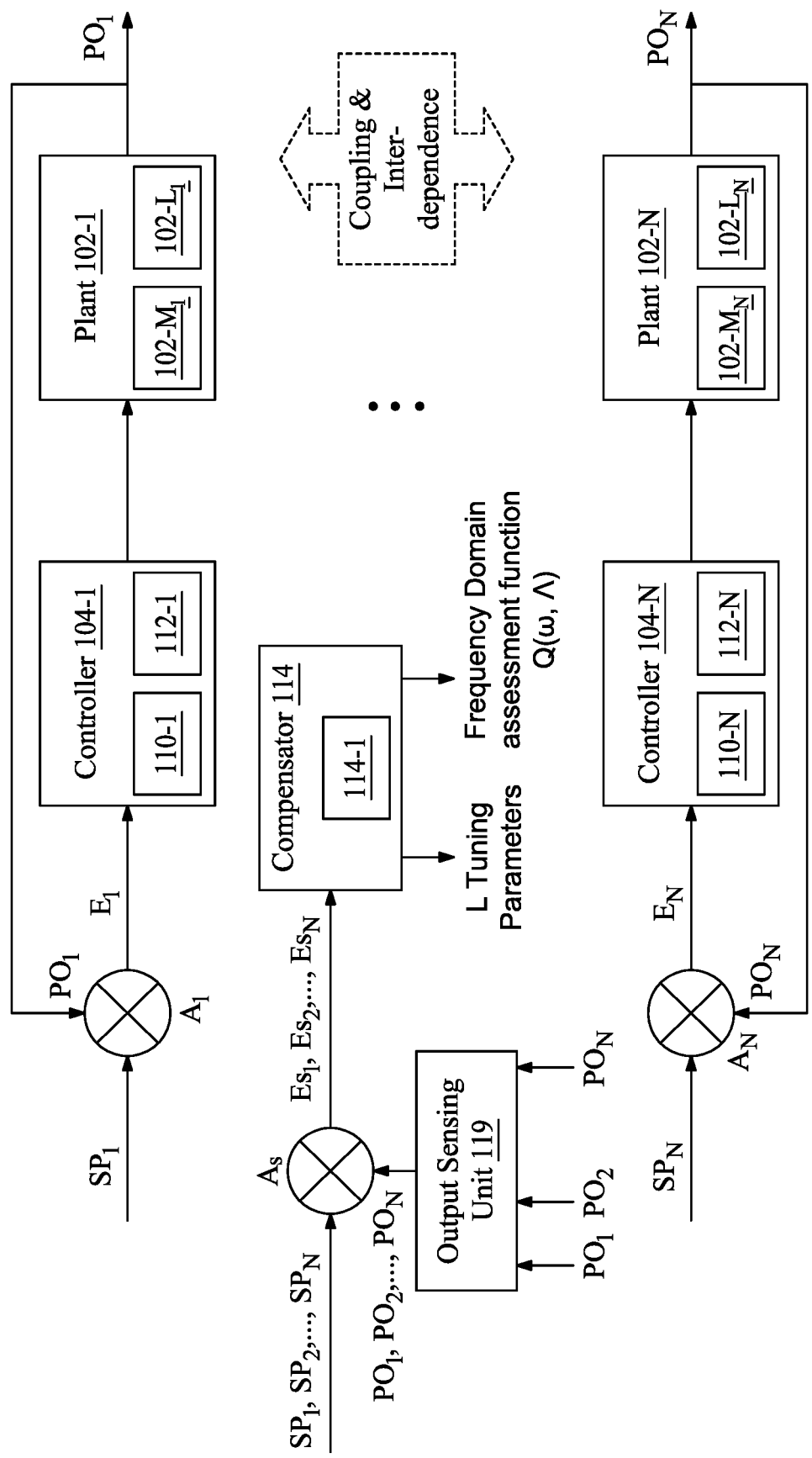
FIG. 1G illustrates a system for a decentralized control of decoupled plants, according to certain embodiments.

FIG. 1G illustrates a system 150 for a decentralized control of decoupled plants. The system 150 may refer to a plant such as a petroleum plant, gas plant, water treatment plant, chemical production plant, and the like. The system 150 may include a number, N, of plants 102-1 to 102-N (e.g., N decoupled plants, referred to collectively as plants 102) to perform a defined task. In an example, the system 150 may be a petroleum plant, where the first plant 102-1 may perform a separation of petroleum product from crude oil, the second plant 102-2 may perform conversion of the crude oil into petroleum, the third plant 102-3 may perform the treatment process of the petroleum and so on. Accordingly, the system 150 includes the plurality of decoupled plants 102-1 to 102-N where each decoupled plant is configured to perform a predefined task. Although the system 150 is referred to as the petroleum plant as an example, the system of the present disclosure can represent other types of plant, such as a gas plant, water plant, and the like.

For the ease of explanation, each decoupled plant may include one or more electro-mechanical equipment components, such as a motor and a load. For example, the decoupled plant 102-1 may include a motor 102-$M_1$ and a load 102-$L_1$, the decoupled plant 102-2 may include a motor 102-$M_2$ and a load 102-$L_2$, and so on. The motor(s) may be directly or indirectly coupled to the load(s), such that when the motor is actuated, the motor may displace the load, or the motor may activate the load to perform the specific task related to, for example, separation of petroleum from crude oil or conversion of crude oil or the treatment process of the petroleum. For example, the motor $102\text{-}M_1$ may be directly or indirectly coupled to the load $102\text{-}L_1$, such that when the motor $102\text{-}M_1$ is actuated, the motor $102\text{-}M_1$ may displace the load $102\text{-}L_1$, or the motor $102\text{-}M_1$ may activate the load $102\text{-}L_1$ to perform the specific task. The plant may include electrical and/or electro-mechanical components other than the motor and the load, each having an associated electrical usage, that collectively achieve the defined goal of the plant.

Each decoupled plant is connected to a controller connected in series. For example, the plant 102-1 is connected in series with a controller 104-1, the plant 102-2 is connected in series with a controller 104-2, and so on. The controllers are referred to collectively as controllers 104. Although the controller is shown separately from the plant, in some examples, the controller may be a part of the decoupled plant.

The system 150 includes an adder 108 ($A_i$) for each decoupled plant i, i=1, . . . , N. Each adder $108_i$ includes at least two input terminals and an output terminal. One of the input terminals receives a set point signal $SP_i$ for the plant 102-$i$ for plants 102-1 to 102-N. The set point signal $SP_i$ may have a frequency $\omega_i$. The other input terminal of the adder $108_i$ receives a negative feedback signal from a corresponding plant output, $PO_i$. The set point refers to a level of a signal over which the plant 102 is expected to operate. In an example, the set point may refer to a voltage level, a current level, a power level and/or an energy level applied to the plant. The first plant 102-1 generates a first output as $PO_1$, and the second plant 102-2 generates a second output as $PO_2$. The third plant 102-3 generates a third output as $PO_3$ and so on.

The adder $108_i$ adds the set point signal $SP_i$ with the negative feedback signal $PO_i$. The adder $108_i$ generates an error signal $E_i$ by adding the set point signal $SP_i$ to the feedback signal $PO_i$. For example, the adder $108_i$ generates an error signal $E_i$ by adding the set point signal $SP_1$ to the feedback signal $PO_1$, an error signal $E_2$ by adding the set point signal $SP_2$ to the feedback signal $PO_2$ and so on, and an error signal $E_n$ by adding the set point signal $SP_n$, to the feedback signal $PO_n$.

Each of the controllers 104-1 to 104-N have corresponding controller interfaces 110-1 to 110-N. For example, the first controller 104-1 has a controller interface 110-1, the second controller 104-1 has a controller interface 110-2, so on, and the N$^{th}$ controller 104-1 has a controller interface 110-N. The controller interface receives a set of L tuning parameters for a corresponding plant from a compensator 114. The set of L tuning parameters may refer to input parameters at which the plant may be set such that the output of the plant is stable. In other words, the output of the plant should be such that the frequency response of the plant does not pass through the virtual region in the frequency domain to remain stable. The response of the plant may be unpredictable in the virtual region (also known as the non-permissible space) in the frequency domain. When the frequency response of the plant is in the virtual region, the plant may be unstable. In other words, the tuning parameters may refer to the value and/or location of poles and zeros of plant in a complex frequency plane which may yield a stable output of the plant. If the values and/or location of the poles and zero deviates from a defined range of values, the controller may yield an unstable output to the plant. Accordingly, the set of tuning parameters may maintain the stability of the corresponding plants 102-1 to 102-N.

Each of the controllers 104-1 to 104-N may have corresponding controller circuitries 112-1 to 112-N. For example, the first controller 104-1 may have the controller circuitry 112-1, the second controller 104-2 may have the controller circuitry 112-2, so on, and the N$^{th}$ controller 104-N may have the controller circuitry 112-N. Each controller circuitry 112-1 to 112-N is configured to receive and modify a corresponding error signal $E_i$. Each controller circuitry 112-1 to 112-N includes a frequency domain assessment function $Q(\omega, \Lambda)$. The frequency domain assessment function $Q(\omega, \Lambda)$ may be a predefined function stored in a memory (not shown) of the controller circuitries 112-1 to 112-N to determine a state of the output of the corresponding plants 102-1 to 102-N at any arbitrary tuning parameter. If the value or the elements of the frequency domain assessment function $Q(\omega, \Lambda)$ lies within the virtual region in the frequency domain, the value indicates an unstable output by the plant. On the other hand, if the value of the frequency domain assessment function $Q(\omega, \Lambda)$ lies outside the virtual region in the frequency domain, the value indicates a stable output from the plant. The controllers 104-1 to 104-N modify or reshape the corresponding error signal, E generated by the corresponding plant 102-1 to 102-N, by modifying the tuning parameter as well as modifying the value of the frequency domain assessment function $Q(\omega, \Lambda)$ based on the modified tuning parameter to generate corresponding drive signals for actuating the corresponding motor $102\text{-}M_{1\text{-}N}$. Actuating the motor $102\text{-}M_{1\text{-}N}$ operates the corresponding load $102\text{-}L_{1\text{-}N}$, which generates a stable output of the plant $PO_i$.

The system 150 includes a compensator 114. The compensator 114 may include a system adder $A_s$ configured to receive the set point signals, $SP_i$ of plants 102-1 to 102-N, subtract system output, $PO_i$ from plants 102-1 to 102-N and generate corresponding system error signals $ES_i$, for i=1, 2, . . . , N. The system adder $A_s$ receives the system output, $PO_i$ from an output sensing unit 119 (similar to the output sensing unit 20). The compensator 114 is configured to sample error signals $ES_i$ as well as plant outputs $PO_i$ from corresponding plants 102-1 to 102-N. The compensator 114 performs a Fourier transform of the error signals, $ES_i$, to transform the error signals, $ES_i$, to a frequency domain. The compensator 114 generates a tuning parameter space vector, $\Lambda$, given by $\Lambda=[\underline{v}_1\ \underline{v}_2\ \ldots\ \underline{v}_L]^T$, where $\underline{v}_i$ represents an i$^{th}$ tuning parameter and T represents a transpose, based on a frequency domain assessment function, $Q(\omega,\Lambda)$, where $Q(\omega, \Lambda)$ is a subset of an admissible region, $\Psi$, in the frequency domain. The compensator 114 obtains the set of L tuning parameters from the tuning parameter space vector, $\Lambda$. The compensator 114 includes a compensator interface 114-I. The compensator interface 114-I is configured to receive the system error signals, $ES_i$, the set of initial values of the L tuning parameters, and the frequency domain assessment function, $Q(\omega, \Lambda)$, for all $\omega$ (described below). Set of L tuning parameters may refer to input parameters at which the plant may be set such that the output of the plant is stable. In other words, the output of the plant should be such that the frequency response of the plant does not pass through the virtual region in the frequency domain to remain stable. The compensator 114 may store an initial set of L tuning parameters which are then modified based on the received setpoints and plant outputs from the controllers. The response of the plant may be unpredictable in the virtual region (also known as the non-permissible space) in the frequency domain. When the frequency response of the plant is in the virtual region, the plant may be unstable. In other words, the set of L tuning parameters may refer to the values and/or locations of poles and zeros of plant in a complex frequency plane which may yield a stable output of the plant. If the values and/or location of the poles and zero deviates from a defined range of values, the controller may yield an unstable output to the plant. Accordingly, the set of tuning parameters may maintain the stability of the corresponding plants 102-1 to 102-N. The initial set of L tuning parameters may refer to input parameters that are provided to the corresponding plants 102-1 to 102-N initially during the start of the system 150. In some examples, the initial set of L tuning parameters may be defined input parameters or non-defined input parameters.

When the output of the plants 102-1 to 102-N are stable, the frequency domain assessment function $Q(\omega, \Lambda)$ becomes a subset of an admissible region, $\Psi$, in the frequency domain.

The compensator 114 transmits the frequency domain assessment function $Q(\omega, \Lambda)$ and the set of L updated tuning parameters to the controller interfaces 110-1 to 110-N of the corresponding plants 102-1 to 102-N. In an aspect, the compensator 114 transmits the frequency domain assessment function $Q(\omega, \Lambda)$ and the set of L new tuning parameters to controller interfaces 110-1 to 110-N of the corresponding plants 102-1 to 102-N wirelessly. The controllers 104-1 to 104-N may apply the new set of L tuning parameters obtained through corresponding controller interfaces 110-1 to 110-N such that the output of the corresponding plant 102-1 to 102-N become stable. As such, the number of communications channels is equal to the number of plants, as intercommunication between the plants is no longer necessary to stable the system.

Figure 1H:
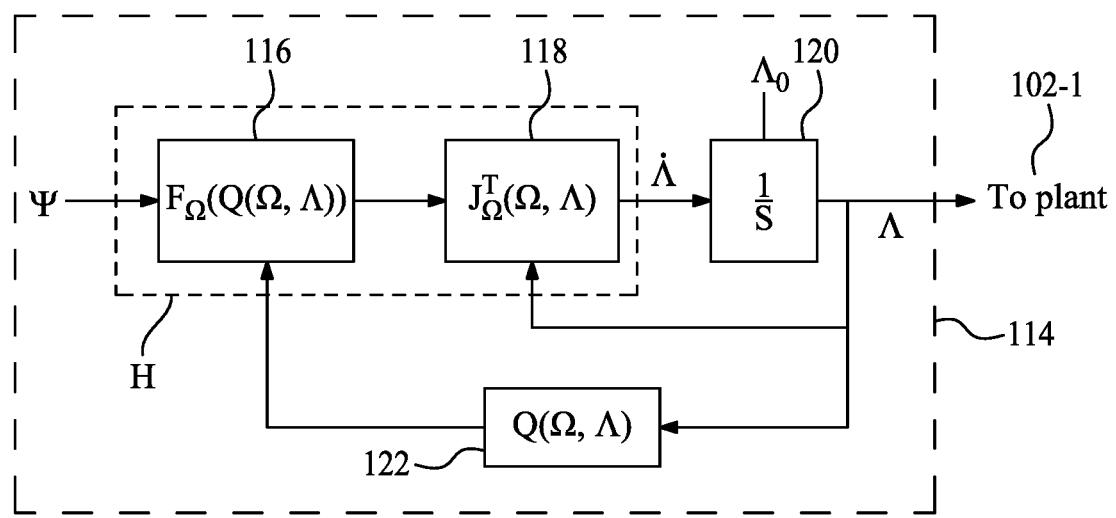
FIG. 1H is a block diagram of the compensator processes, according to certain embodiments.

FIG. 1H illustrates a detailed view of the processing units of the compensator 114. The compensator 114 includes, inter alia, a force vector calculation unit 116, a Jacobian vector calculation unit 118, an integrator unit 120 and a frequency domain assessment function calculation unit 122. Each or some of the units of the compensator 114 may be a part of one or more processors H configured to store program instructions that, when executed by the one or more processors H, cause the processors H to perform a corresponding force vector calculation, a Jacobian vector calculation, an integration and/or a frequency domain assessment function calculation. In the example, the force vector calculation unit 116, a Jacobian vector calculation unit 118 are shown to be the part of one or more processors H.

The output of the integrator unit 120 is provided to the corresponding plant 102-1 to 102-N. For ease of explanation, the output of integrator unit 120 may be provided to the plant 102-1. The output is also provided as feedback to the frequency domain assessment function calculation unit 122. The frequency domain assessment function calculation unit 122 identifies whether the frequency response of the plant 102-1 lies within the admissible region, $\Psi$, or in the virtual region, $\Gamma$, based on the tuning parameter space vector $\Gamma$ and generates an assessment output. The assessment output is input to the force vector calculation unit 116. The force vector calculation unit 116 identifies a virtual action, $\Gamma$, to be applied on a set of points, P, of the frequency response of the plant 102-1 that is within the virtual region, $\Gamma$, to map the set of points, P, into the admissible region, $\Psi$, to make the response of the plant 102-1 stable. The output of the force vector calculation unit 116 indicates the deviation of the tuning parameter from its defined value. The output of the force vector calculation unit 116 is input to the Jacobian vector calculation unit 118.

The output of the integrator unit 120 is also provided as a feedback to the Jacobian vector calculation unit 118. Based on the output of the force vector calculation unit 116 and the output of the integrator unit 120, the Jacobian vector calculation unit 118 generates a L-dimensional state space, $\Lambda(\mathcal{L})$, having coordinates equal to each coordinate of the tuning parameter space vector, $\Lambda$. The Jacobian vector calculation unit 118 generates an L-dimensional image subspace, $\mathcal{F}(\Lambda)$, based on the L-dimensional state space, $\Lambda(\mathcal{L})$, and constructs an extended Jacobian matrix, $J_\Omega(\Omega)$, at each sampling frequency. The Jacobian vector calculation unit 118 constructs a complete orthonormal set of tuning parameters of vectors tangent to $\mathcal{F}(\Lambda)$ from each column of the extended Jacobian matrix, $J_\Omega(\omega)$, projects a force vector, $F(\Omega)$, on $\mathcal{F}_\Lambda$, such that $\mathcal{F}_\Lambda = J_\Omega^T(\Omega) F_\Omega(\Omega)$ and accordingly calculates a change in the tuning parameter space vector $\Lambda$ in the differentiated form ($\dot{\Lambda}$). The output of the Jacobian vector calculation unit 118 is input to the integrator unit 120. The integrator unit 120 is configured to integrate the differentiated form of the change in the tuning parameter space vector ($\dot{\Lambda}$) to obtain the tuning parameter space vector, $\Lambda$.

The working of the compensator 114 along with other components of the system to generate the set of tuning parameters for stabilizing the output of the plant 102-1, is described with reference to FIG. 1G and FIG. 1H in detail.

Whenever a set point is input to the compensator 114, the compensator 114 identifies, based on the set point, a range of the admissible region, $\Psi$, in a complex plane C, where $\Omega \subset C$. In an aspect, the range of the admissible region, $\Psi$, may be predefined in the compensator 114 based on the set point. In an aspect, the range of the admissible region, $\Psi$, may be manually provided to the compensator 114. In frequency domain, the complex plane C confines the entire range of frequency in the frequency domain that is, from 0 to $\infty$. The range of the admissible region, $\Psi$, indicates a frequency range where the output of the plant 102-1 is stable. In other words, the values of the frequencies of the frequency domain assistant function $Q(\omega, \Lambda)$ should be within the admissible region, $\Psi$, for the output of the plant 102-1 to be stable. The frequency response of the plant 102-1 that falls outside the admissible region, $\Psi$, may lead to an unstable output from the plant 102-1. The frequency response may be interrelated with the location and values of the poles and the zeros of the combined compensator and the plant 102-1. In other words, the poles and zeros of the plant 102-1 in the frequency domain should be such that the open loop frequency response of the cascaded compensator 114 and the plant 102-1 is outside a unit circle in a complex plane S. When the open loop frequency response lies outside the unit circle, correspondingly the frequency domain assessment function $Q(\omega, \Lambda)$ lies within the admissible region, $\Psi$. On the other hand, if the poles and zeros are such that the open loop frequency response intersects or inside the unit circle, the frequency domain assessment function $Q(\omega, \Lambda)$ lies in the virtual region $\Gamma$ or outside the admissible region $\Psi$.

Any deviation in the location of the poles and zeros, for example, due to actuator saturation or an uncontrolled delay in the plant 102-1, may deviate the frequency response of the plant 102-1 away from the admissible region, $\Psi$. When the frequency response of the plant 102-1 lies outside the admissible region, $\Psi$, the tuning parameters, that is, the location of the poles and zeros may be modified so that the frequency response of the system is moved back within the admissible region, $\Psi$. Accordingly, the behavior of the plant 102-1 may be modified as illustrated in FIG. 1I as described in detail.

Figure 1I:
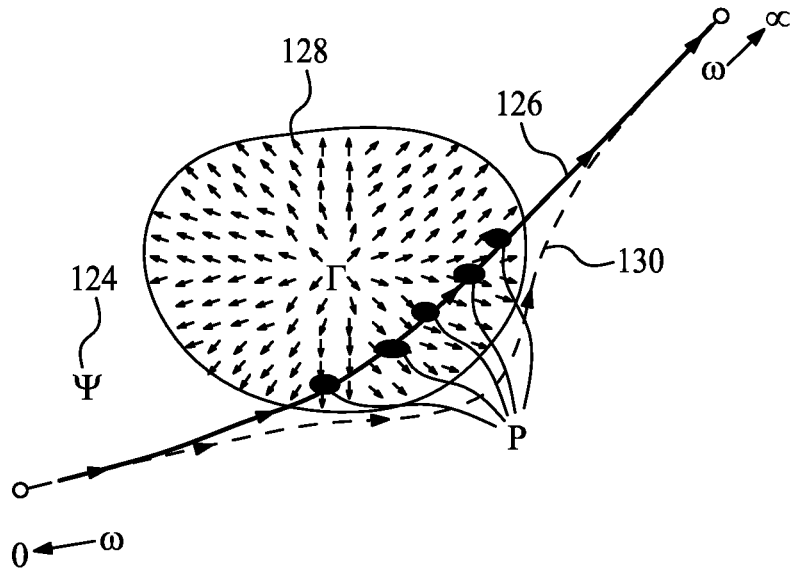
FIG. 1I illustrates an admissible and a non-admissible region in a frequency domain, according to certain embodiments

FIG. 1I illustrates the admissible region, $\Psi$, and the virtual region, $\Gamma$, in reference to the plant 102-1. Although the plant 102-1 and the compensator 114 is referenced for the ease of explanation, the explanation is equally applicable to the other plants 102-2 to 102-N in conjunction with the compensator 114. A first complex region 124 includes the admissible region Ψ where the frequency response of the plant 102-1 is stable. The frequency response of the plant 102-1 is represented by a response curve 126, that indicates the behavior of the plant 102-1 for various ranges of frequencies. If the response curve 126 is within the admissible region, Ψ, or the first complex region 124, the frequency response of the plant 102-1 is stable. However, there is a second complex region 128 representing the virtual region, Γ, where the frequency response of the plant 102-1 is not stable. If the plant 102-1 operates within the range of the frequency where the response curve 126 passes through by the virtual region, Γ, 128, the output of the plant 102-1 is unpredictable or unstable. The unpredictable behavior of the plant 102-1 may be due to various reasons including an improper set of tuning parameters that is initially applied to the plant 102-1 or may be due to backlash, wear and tear, actuator saturation or delay. Accordingly, if the tuning parameters are readjusted, the response curve 126 may be translated out of the virtual region, Γ, 128 defined by Γ=(C−Ψ). A dashed curve 130 shown indicates a mapping of the response curve 126 to be performed to move the response curve 126 out of the virtual region Γ. The dashed curve 130 out of the virtual region Γ, 128, stabilizes the plant 102-1.

If output of the plant 102-1 deviates, the error signal $E_i$ is received at the controller 104-1 and the behavior, that is, the frequency response of the plant 102-1 must be adjusted. The frequency response of the plant 102-1 may be adjusted using the L tuning parameters given by the tuning parameter space vector $\Lambda=[\gamma_1\ \gamma_2\ \ldots\ \gamma_L]^T$. Initially, a set of initial L tuning parameters may be provided to the compensator 114 through the controller interface 110-1. The compensator interface 114-I may receive the frequency domain assistant function $Q(\omega, \Lambda)$ for all ω. Initially, the controller 104 may assume any arbitrary value of the tuning parameter that may be applied to the plant 102-1. If there is a difference between the set point signal applied to the plant 102 and the feedback signal from the output of the plant 102-1 after the application of the tuning parameter, the error $E_i$ is generated and provided to the compensator 114. The compensator 114 performs a Fourier transform of the error signals, $E_i$, to transform the error signals, $E_i$, to the frequency domain. The compensator 114 may use the frequency domain assessment function calculation unit 122-1 to calculate frequencies at which the plant 102-1 is providing unstable output. The presence of any parts of frequency domain assessment function $Q(\omega, \Lambda)$ in the virtual region Γ ($Q(\omega, \Lambda) \cap \Gamma \neq \phi \forall \omega$) indicates that the plant 102-1 is violating the stability/performance constraints when applying the initial set of tuning parameters to the compensator 114.

The frequency domain assessment function calculation unit 122 may confirm the presence of a portion of the response curve 126 within the virtual region, Γ, for example, a number of points P on the response curve 126. Presence of any parts of frequency domain assessment function $Q(\omega, \Lambda)$ in the virtual region, Γ, 128 triggers the compensator 114 to determine a virtual action, F. Determining the virtual action, F, may include determining the distance of the set of points, P, from the interfacial boundary of the admissible region, Ψ, where the set of the points, P is located over the response curve 126 within the virtual region, Γ, 128. As such, more is the distance of the set of points, P, in the virtual region, Γ, 128 from the interfacial boundary of the admissible region Ψ, more is the virtual action, F, required to map the set of points, P, from the virtual region, Γ, 128 to the admissible region, Ψ, and make the output of the plant 102-1 stable.

Figure 1J:
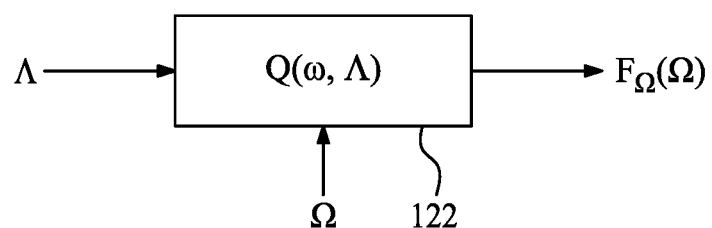
FIG. 1J illustrates a process of computing a virtual action F, according to certain embodiments.

FIG. 1J illustrates a process of the compensator 114 to compute the virtual action, F. The frequency domain assessment function calculation unit 122-1 initiates the force vector calculation unit 116 to compute the virtual action F which populates the virtual region, Γ, 128, in the complex plane region C, where Γ=C−Ψ. The virtual function F of the frequency domain has the initial set of points, P, within the virtual region, Γ, 128, due to the initial set of tuning parameters, as illustrated in FIG. 1I. For example, whenever frequency domain assessment function $Q(\omega, \Lambda)$ lies in the virtual region, Γ, 128, the frequency domain assessment function $Q(\omega, \Lambda)$ may have to be mapped from virtual region Γ to the admissible region, Ψ, 124. A set of points, P, may indicate the sample of points in the frequency domain residing in the virtual region, Γ, 128. The force vector calculation unit 116 maps each point in the complex plane to a force $F(P): C \to R^2$, $F(P)=[F_r(P)\ F_i(P)]^T$ where $R^2$ is a two-dimensional real number plane, and $F_r$ and $F_i$ are real and imaginary components of F. Since the virtual action, F, is the gradient of an underlying scalar function V (F=−∇V)) that measures the extent, the set of points, P, violate the boundary of the virtual region, Γ, 128. The force F(P) drives the set of points, P, from the virtual region, Γ, 128, to any point in the admissible region, 124. If the force vector calculation unit 116 computes the value of the virtual force, F, in the virtual region, Γ, 128, the virtual force, F, may be a non-zero value, whereas the virtual force, F, computed in the admissible region, Ψ, 124, has zero value.

Accordingly, in order to compute a force vector F(Ω), the compensator 114 generates a sampling frequency vector Ω, where $\Omega=[\omega_1, \omega_2, \ldots, \omega_N]^T$. The sampling frequency vector Ω includes a plurality of frequency samples in the frequency domain. The compensator 114 applies the sampling frequency vector Ω to the force, F(P). For every value of the sample of the frequency vector at every point of the set of the initial tuning parameter, the frequency domain assessment function calculation unit 122 generates a corresponding set of a force vector F(Ω). In vector form, the frequency domain assessment function calculation unit 122 may represent the force vector F(Ω), as an extended virtual repelling action at every sampling frequency in the complex plane C as:

$$F_\Omega(\Omega) = \begin{bmatrix} F(Q(\omega_1, \Lambda)) \\ F(Q(\omega_2, \Lambda)) \\ \cdot \\ \cdot \\ F(Q(\omega_N, \Lambda)) \end{bmatrix},$$

where Ω is the sampling frequency vector $\Omega=[\omega_1\ \omega_2\ \ldots\ \omega_N]^T$.

Since the virtual action, F, may affect the set of points, P, in the frequency domain assessment function, the state of the frequency domain assistant function Q(ω, Λ) is represented by the collective state of its points at frequency samples (ω$_i$ i=1:N). The samples may be taken in accordance with a sampling theorem for perfect reconstruction of frequency domain assistant function Q(ω, Λ) from its samples.

The force vector F(Ω) represents a state vector that indicates whether or not the system 150 is complying with the stability/performance constraints of the plant 102-1. If the value of the force vector F(Ω) is zero, the plant 102-1 is in a state of compliance with the specifications, otherwise, the plant 102-1 is unstable. The force vector calculation unit 116 may also include a comparator unit (not shown) for comparing the value of force vector |F(Ω)|. When the |F(Ω)|>0, the frequency domain assessment function calculation unit 122 identifies that the system violates constraints. When the |F(Ω)|=0, the frequency domain assessment function calculation unit 122 identifies that the system complies with the constraints. In other words, the compensator 114 identifies that the output of the plant 102-1 is stable and no compensation or amendment of the current tuning parameter is needed if the output of the force vector calculation unit 116 is zero. Otherwise, the force vector calculation unit 116 may amend the tuning parameters.

When the force vector calculation unit 116 identifies that compensator 114 is not in compliance with the set of constraints, the compensator 114 identifies that the force vector F$_Ω$(Ω) exerting on frequency domain assessment function Q(ω, Λ) should be converted into an equivalent action that the tuning parameter Λ exerts on the frequency domain assessment function Q(ω, Λ). Accordingly, an L-dimensional state space, whose coordinates are the individual components of the tuning parameter space vector Λ ($\mathcal{L}$), is identified. The force vector calculation unit 116 generates an L-dimensional state space Λ($\mathcal{L}$), having coordinates equal to each coordinate of the tuning parameter space vector, Λ, and generates an L-dimensional image subspace, $\mathcal{F}$ (Λ), based on the L-dimensional state space, Λ($\mathcal{L}$). This is illustrated in FIG. 1K in detail.

Figure 1K:
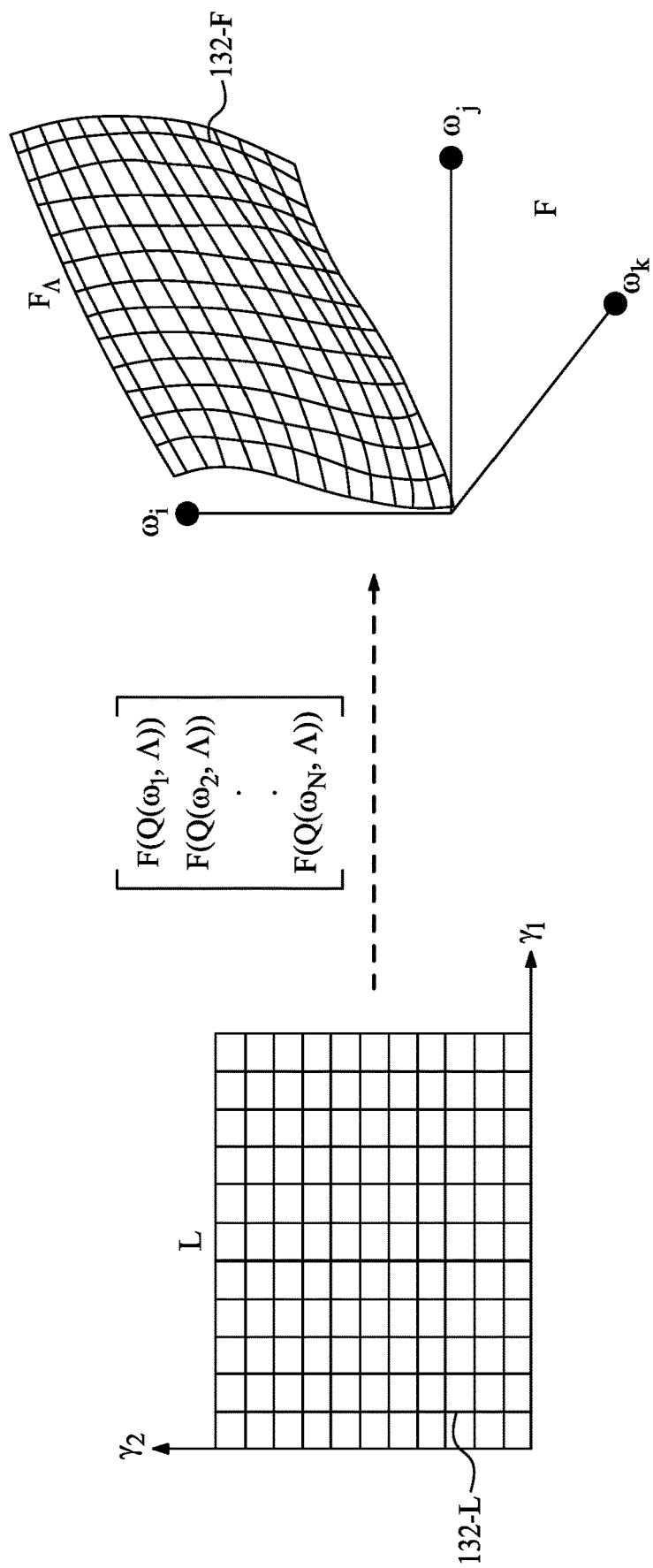
FIG. 1K illustrates a mapping of the tuning parameter space into an equivalent L-dimensional image subspace $\mathcal{F}(\Lambda)$, according to certain embodiments.

FIG. 1K illustrates a mapping of a tuning parameter space 132-L into an equivalent L-dimensional image subspace $\mathcal{F}$ (Λ) 132-F. The tuning parameter space 132-L is to be projected onto the L-dimensional image subspace $\mathcal{F}$ (Λ) 132-F. The compensator 114 generates a value for tuning parameter space vector Λ that places the frequency domain assistant function Q(ω, Λ) in the admissible region Ψ, or equivalently drives the force vector F$_Ω$(Ω) to zero and the $\mathcal{F}$ (Λ), connects and passes through the origin of virtual action, F. Accordingly, the projection of F$_Ω$ in the L-dimensional image subspace $\mathcal{F}$ (Λ) 132 is used by the compensator 114 that drives the evolution of Λ in the L space. The output of the subunit (not shown) is provided to the Jacobian vector calculation unit 118 and the compensator 114 triggers the Jacobian vector calculation unit 118 to project the force vector, F(Ω), on L-dimensional image subspace $\mathcal{F}$ (Λ) 132-F.

Referring back to FIG. 1G and FIG. 1H, the Jacobian vector calculation unit 118 constructs an extended Jacobian matrix, J$_Ω$(Ω), at each sampling frequency ω. Since, computing the projection of the force vector F$_Ω$ on L-dimensional image subspace $\mathcal{F}$ (Λ) requires the construction of a complete orthogonal set of vectors that are tangent to $\mathcal{F}$ (Λ), the Jacobian vector calculation unit 118 constructs the complete orthonormal set of vectors tangent to $\mathcal{F}$ (Λ) from each column of the extended Jacobian matrix, J$_Ω$(Ω). In vector form, the extended Jacobian matrix, J$_Ω$(Ω), obtained from the columns of the extended Jacobian matrix at each sampling frequency (J$_Ω$(Ω)) may be represented as:

$$J_\Omega(\Omega) = \begin{bmatrix} J(\omega_1) \\ J(\omega_2) \\ \cdot \\ \cdot \\ J(\omega_N) \end{bmatrix},$$

where:

$$J(\omega) = \begin{bmatrix} \frac{\partial \text{Re}(Q(\omega, \Lambda))}{\partial \Lambda} \\ \frac{\partial \text{Im}(Q(\omega, \Lambda))}{\partial \Lambda} \end{bmatrix}.$$

Based on the values of the extended Jacobian matrix, J$_Ω$(Ω), the Jacobian vector calculation unit 118 projects the force vector, F(Ω), on $\mathcal{F}$$_Λ$, such that:

$$\mathcal{F}_\Lambda = J_\Omega^T(\omega) F_\Omega(\Omega).$$

The projection of the force vector F(Ω) may drive the evolution of the parameter vector Λ. As such, the output of the Jacobian vector calculation unit 118 may calculate a differentiated form of the modified L tuning parameter Λ given by:

$$\dot{\Lambda} = J_\Omega^T(Q(\Omega, \Lambda)) F_\Omega(Q(\Omega, \Lambda)) \text{ for } \Lambda(0) = \Lambda_0,$$

where $\dot{\Lambda}$ is a change in the tuning parameter space vector, Λ.

The integrator unit 120 of the compensator 114 receives the differentiated form of the modified L tuning parameter ($\dot{\Lambda}$). The integrator unit 120 may refer to an integrator in the time domain which may be transformed into 1/S in the Laplace domain. The integrator unit 120 integrates the differentiated form of the modified L tuning parameter ($\dot{\Lambda}$) and yields the tuning parameter space vector, Λ. The integration process of integrator unit 120 is an iterative process that keeps on integrating the value of $\dot{\Lambda}$ till the F$_Ω$ becomes zero and the frequency domain assistant function Q(ω, Λ) is mapped into the permissible region, Ψ, 124. Also, the projection of force vector, F(Ω), on $\mathcal{F}$$_Λ$ drives the tuning parameter space vector Λ to a value that drives force vector, F(Ω), to zero. In other words, the initial set of tuning parameters are iteratively updated until final value of the tuning parameters are obtained that stabilizes the output of the plant 102-1. Once the modified set of L tuning parameters from the tuning parameter space vector Λ are obtained, the modified set of L tuning parameters are transmitted, along with the frequency domain assessment function, Q(ω, Λ) to the controller interface 110-1 of the plant 102-1. The controller interface 110-1 may apply the modified set of L tuning parameters that stabilizes the output of the plant 102-1. When the output of the plant 102-1 becomes stable, the frequency domain assessment function calculation unit 122 identifies that the set of points, P, lies in the admissible region, Ψ, 124, and no further modification in the tuning parameters are required. The compensator 114 terminates the modification process of the tuning parameters and the plant 102-1 continues to provide a stable output. Accordingly, even if the plant 102-1 observes the actuator saturation or the delay after the stabilization, the output of the plant 102-1 may further be stabilized by readjusting the tuning parameter using the compensator 114 as described above.

Figure 2A:
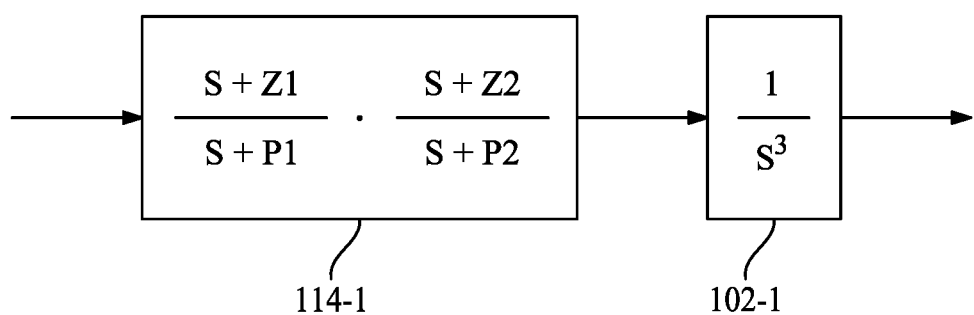
FIG. 2A illustrates a cascaded system including a compensator and a plant, when the plant does not experience an actuator saturation or a delay, according to certain embodiments.

FIG. 2A illustrates a cascaded system that includes a compensator and a plant when the plant does not experience an actuator saturation or a delay, according to an aspect. For the ease of explanation, the plant 102-1 and the compensator 114 are referenced. The explanation provided is equally applicable to the other plants 102-2 to 102-N and the compensator 114.

The compensator 114, in the current example, is a second order system. The transfer function $G_c$ of the compensator 114 is given by:

$$G_c(S, P1, Z1, P2, Z2) = \frac{S+Z1}{S+P1} \cdot \frac{S+Z2}{S+P2},$$

where $Z_1$, $Z_2$, are the zeros and $P_1$ and $P_2$ are the poles of the compensator 114, and S denotes a complex frequency plane having real and imaginary part.

The plant 102-1 selected for the example is a third order system with transfer function G(S) and is given by:

$$G(S) = \frac{1}{S^3}.$$

The plant 102-1 and the compensator 114 are cascaded in series. The transfer function of the cascaded system is given by:

$$G(S) * G_c = \frac{S+Z1}{S+P1} \cdot \frac{S+Z2}{S+P2} * \frac{1}{S^3}$$

The compensator 114 and the plant 102-1 are shown as having no feedback when computing the open loop frequency response of the cascaded system. However, when finding the closed loop frequency response of the cascaded system, unity feedback may be present. The compensator 114 initially applied a set of L tuning parameters given by:

$Z_1=0.45$, $P_1=0.55$, $Z_2=0.40$, $P_2=0.60$.

The set of tuning parameters were received at the controller interface 110-1 of the controller 104-1. Based on frequency domain analysis of the tuning parameters, the initial set of the tuning parameters, that is, at the poles and zeros values, the closed loop step response of the plant 102-1 was determined to be unstable.

Figure 2B:
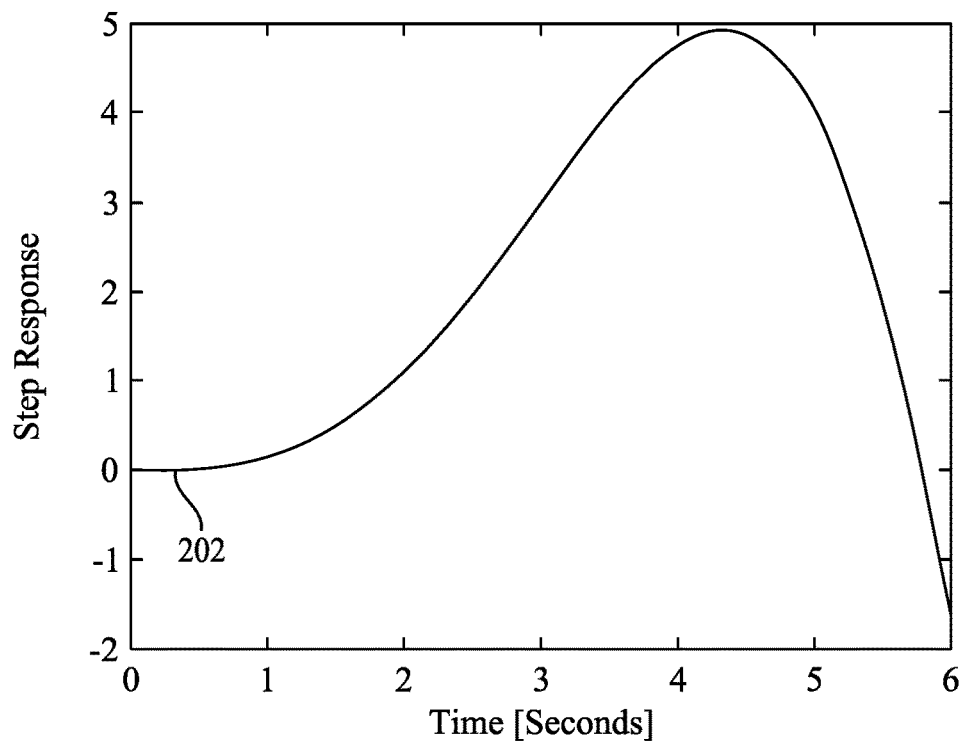
FIG. 2B illustrates a step response of the cascaded system, according to certain embodiments.

FIG. 2B is an example illustrating a step response of the cascaded system of the plant 102-1 and the compensator 114. A curve 202 approaches zero or negative value after some time. As described earlier, initial values of the tuning parameters lead to an unstable response from the plant 102-1. The compensator 114 identified that the open loop frequency response of the plant 102-1 should lie outside a circle of radius 0.75, surrounding −1 on a real axis. The compensator 114 identified a presence of an error signal $E_i$. The compensator 114 sampled the error signals, $E_i$, and the plant outputs, $PO_i$, and transformed the error signals $E_i$ into a frequency domain. Based upon the error signal $E_i$ and the frequency domain assessment function, $Q(\omega, \Lambda)$, the compensator 114 generated a new set of tuning parameters. The frequency domain assessment function $Q(\omega, \Lambda)$ identified the state of the output of the plant 102-1 and identified the presence of the frequency response of the plant 102-1 within the virtual region, $\Gamma$. The force vector calculation unit 116 determined the virtual force, F, that is required to map the set of points, P, of the frequency response of the plant 102-1 that is enclosed in the virtual region, $\Gamma$ to map the points into the admissible region, $\Psi$, and stabilize the response of the plant 102-1. An L-dimensional state space whose coordinates are the individual components of the tuning parameter space vector, $\Lambda$ ($\mathcal{L}$) were identified. The compensator 114 generated an L-dimensional state space, $\Lambda(\mathcal{L})$, having coordinates equal to each coordinate of the tuning parameter space vector, $\Lambda$, and generated an L-dimensional image subspace, $\mathcal{F}(\Lambda)$, based on the L-dimensional state space, $\Lambda(\mathcal{L})$. Further, the Jacobian vector calculation unit 118 computed the differentiated form of the modified L tuning parameter, $\Lambda$, which upon passing through the integrator unit 120 generates a new set of tuning parameters. The compensator 114 identified a new set of tuning parameters that converged at:

$Z_1=0.0$, $P_1=1.27$, $Z_2=0.0$, $P_2=1.29$.

Figure 2C:
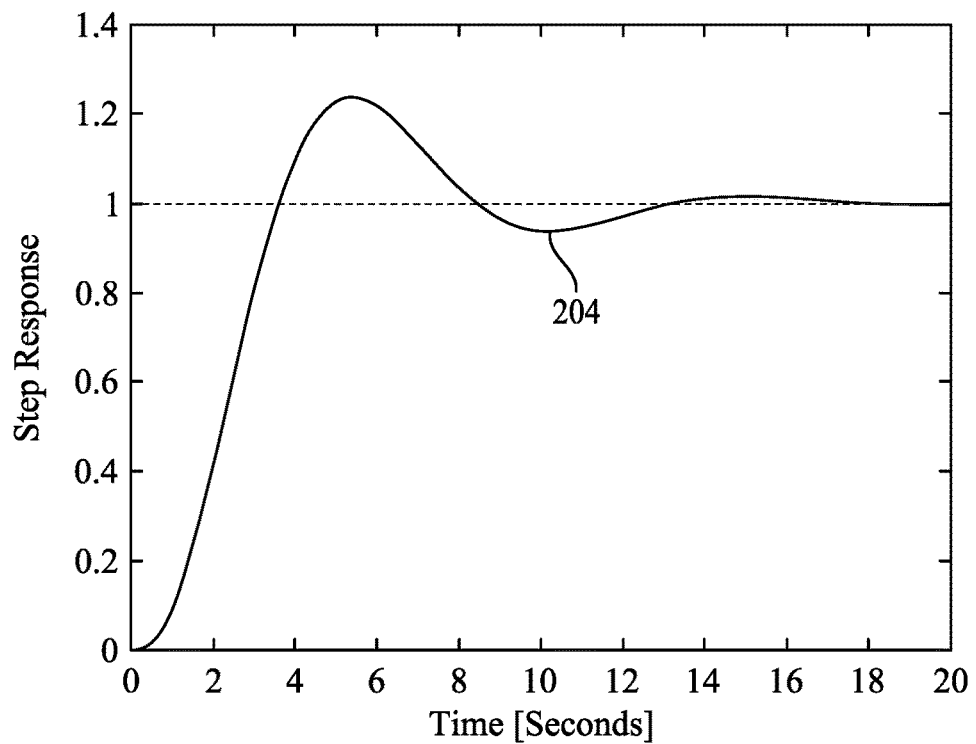
FIG. 2C illustrates a stable step response of the cascaded system based on a new set of tuning parameters, according to certain embodiments.

With the new set of tuning parameters, the output of the plant 102 was stable. Based on the new set of tuning parameters, a curve 204 was derived which is illustrated in FIG. 2C showing a stable step response of the plant 102.

Figure 2D:
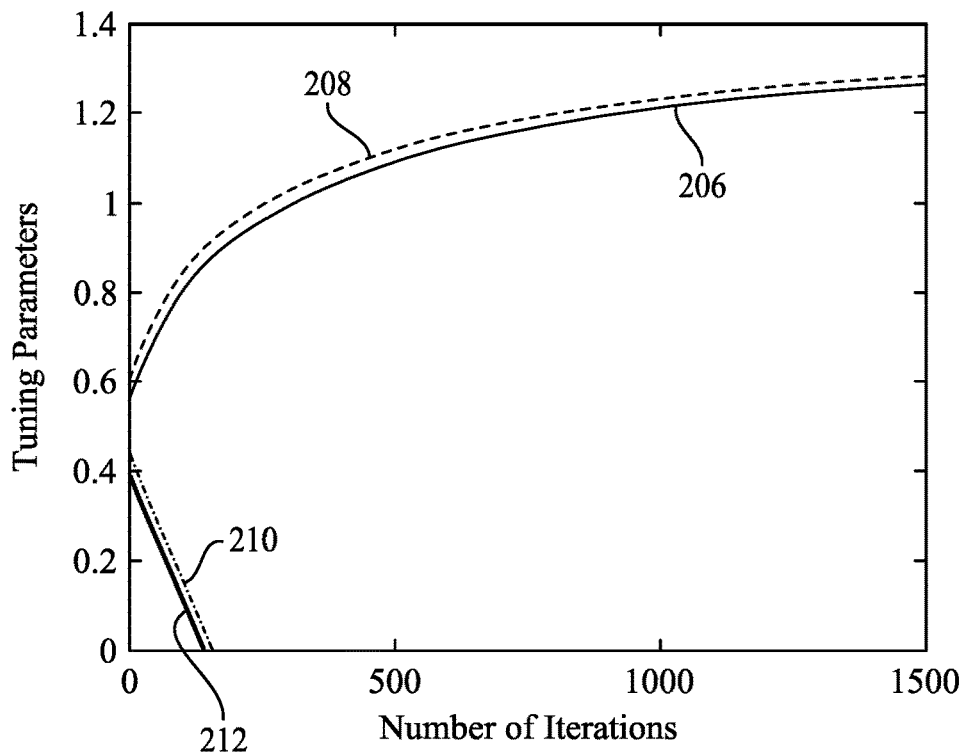
FIG. 2D illustrates an evolution of the tuning parameters by the number of iterations of the cascaded system, according to certain embodiments.

FIG. 2D illustrates an evolution of the tuning parameters of the cascaded system of the plant 102-1 and the compensator 114. When the plant 102-1 began functioning with the initial set of tuning parameters, value of pole $P_1=0.55$ as represented by a curve 206, value of the pole $P_2=0.60$ as represented by a curve 208, value of zero $Z_1=0.45$ represented by a curve 210 and a value of the zero $Z_2=0.40$ represented by a curve 212 were plotted. However, as the output of the plant 102-1 was unstable at the set of tuning parameters, the compensator 114 modified the tuning parameter over several iterations that led to convergence of the poles and zeros to a new value which was obtained when multiple iterations were performed by the compensator 114. Accordingly, a new set of tuning parameters obtained were:

$Z_1=0.0$, $P_1=1.27$, $Z_2=0.0$, $P_2=1.29$.

Figure 2E:
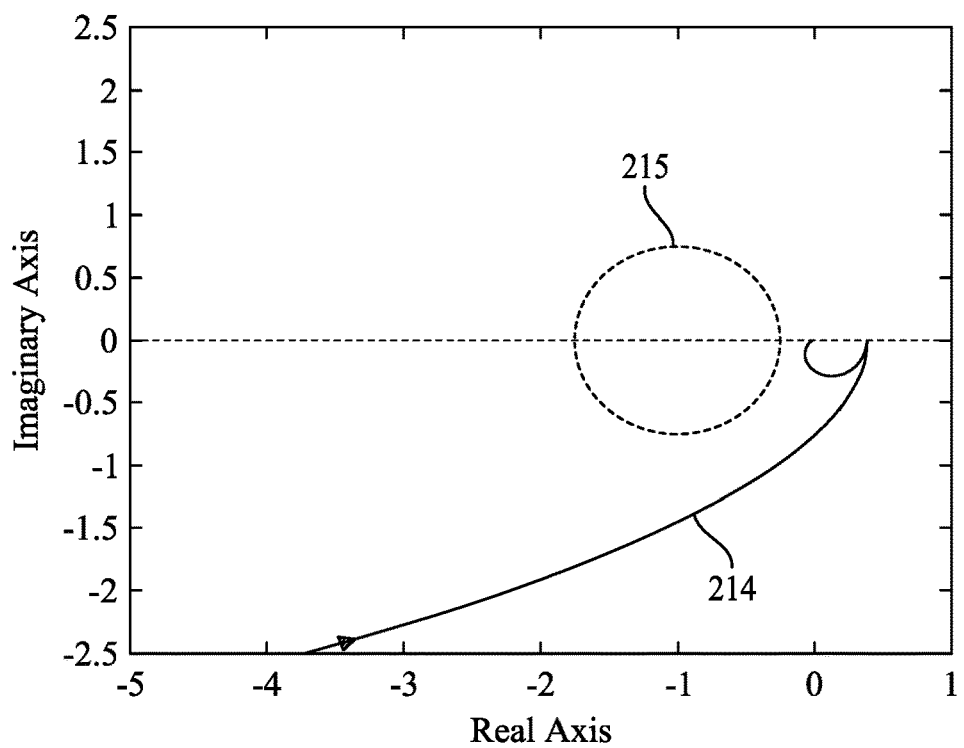
FIG. 2E illustrates an open loop frequency response of a plant for a modified set of tuning parameters, according to certain embodiments.

FIG. 2E illustrates an open loop frequency response of the plant 102-1 due to the modified set of tuning parameters. At the new values of the tuning parameters, a curve 214 represents the frequency response of the plant 102-1 that was outside circle 215 of radius 0.75.

Figure 2F:
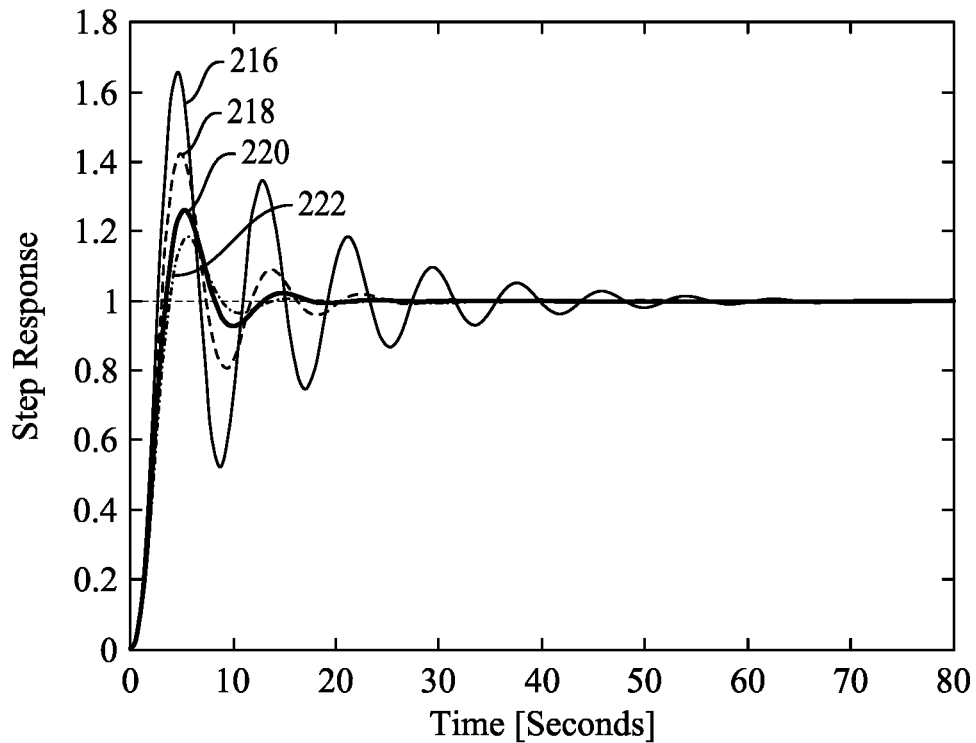
FIG. 2F illustrates a closed loop step frequency response of the plant based on a modified set of tuning parameters, according to certain embodiments.

FIG. 2F illustrates a closed loop frequency response of the plant 102-1 due to the modified set of tuning parameters. The plant 102-1 and the compensator 114 were tested with different overshoot values. For example, curves 216, 218, 220, and 222, represent the closed loop frequency response of the plant 102-1 at circle radius 0.2, 0.4, 0.6, and 0.8, respectively. It was concluded that as the phase margin (radius of the circle) gets bigger, the overshoot gets lower along with the settling time.

Figure 3A:
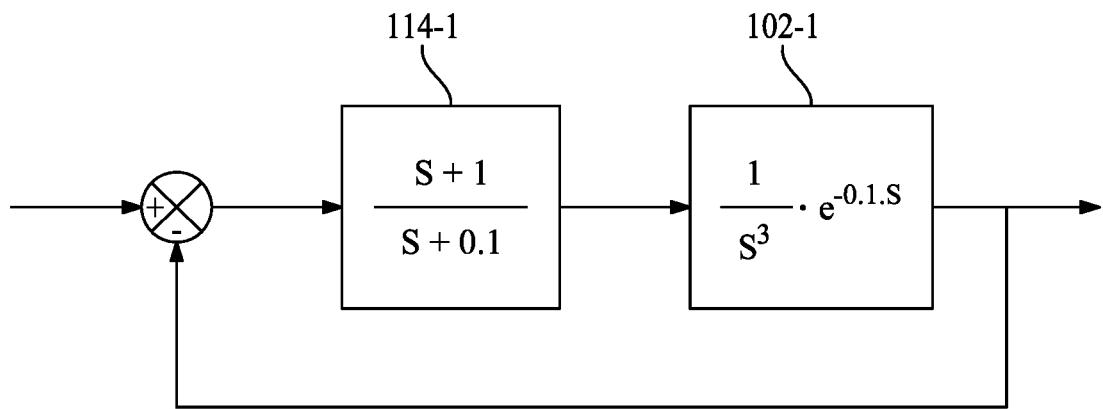
FIG. 3A illustrates a cascaded system including a compensator and a plant, when the plant experiences a delay, according to certain embodiments.

FIG. 3A illustrates a cascaded system having the compensator 114 and the plant 102-1, when the plant 102-1 experiences a delay, according to an aspect. The compensator 114, in the current example, is a first order system. The transfer function $G_c$ of the compensator 114 is given by:

$$G_c(S) = \frac{S+Z}{S+P}.$$

The plant 102-1 selected for the example is a second order system with transfer function given by:

$$G(S) = \frac{1}{S^2} \cdot e^{-T \cdot S}.$$

The plant 102-1 and the compensator 114 are cascaded in series. The transfer function of the cascaded system is given by:

$$G(S) * G_c(S) = \frac{1}{S^2} \cdot e^{-T \cdot S} \cdot \frac{S+Z}{S+P}.$$

Since the plant 102-1 had a certain delay in its output, the compensator 114 stabilized the output of the plant 102-1. The delay may cause instability in the output of the plant 102-1. Also, the open loop frequency response should be outside a circle of radius 0.7 surrounding −1 on the real axis if the output of the plant 102-1 is to be stable.

The compensator 114 initially applied a set of L tuning parameters as given by:

Z=1.0; P=0.1.

The set of tuning parameters was received at the interface 110-1 of the controller 104-1. Accordingly, the transfer function $G_c(S)$ of the compensator 114 was given as:

$$G_c(S) = \frac{S+1}{S+0.1}.$$

Figure 3B:
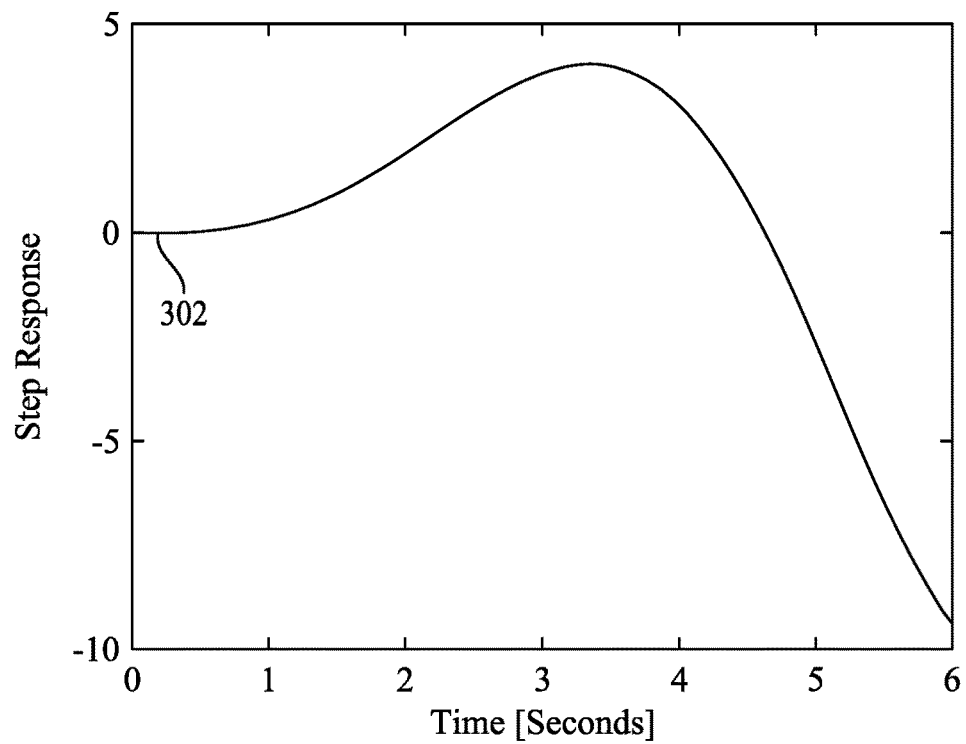
FIG. 3B illustrates a step response to the cascaded system experiencing delays, according to certain embodiments.

FIG. 3B illustrates a step response to the cascaded system experiencing delays. A curve 302 illustrates a step response of the cascaded system of the plant 102-1 and the compensator 114. Considering the frequency domain, at the initial set of the tuning parameters, that is, at the poles and zeros values, the closed loop step response of the plant 102-1 was unstable since the curve 302 approached zero or negative value after four seconds. Thus, the initial values of the set of tuning parameters led to an unstable response from the plant 102-1. The compensator 114 identified that the open loop frequency response of the plant 102-1 should be anywhere outside a circle of radius 0.70, surrounding −1 on the real axis. Accordingly, the compensator 114 identified a new set of tuning parameters that converged at:

Z=0.0; P=1.01.

At these values of the set of tuning parameters, the output of the plant 102-1 was found stable.

Figure 3C:
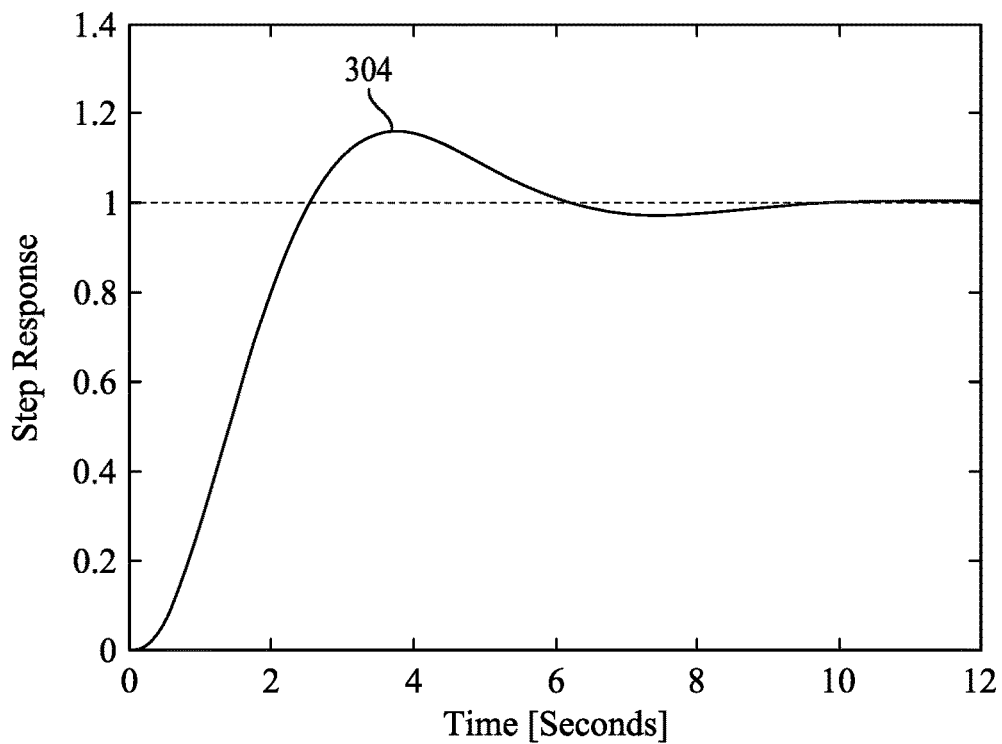
FIG. 3C illustrates a closed loop step response of the plant, according to certain embodiments.

FIG. 3C illustrates a close loop step response of the plant 102-1. At the new set of tuning parameters, a curve 304 illustrates a stable close loop step response of the plant 102-1.

Figure 3D:
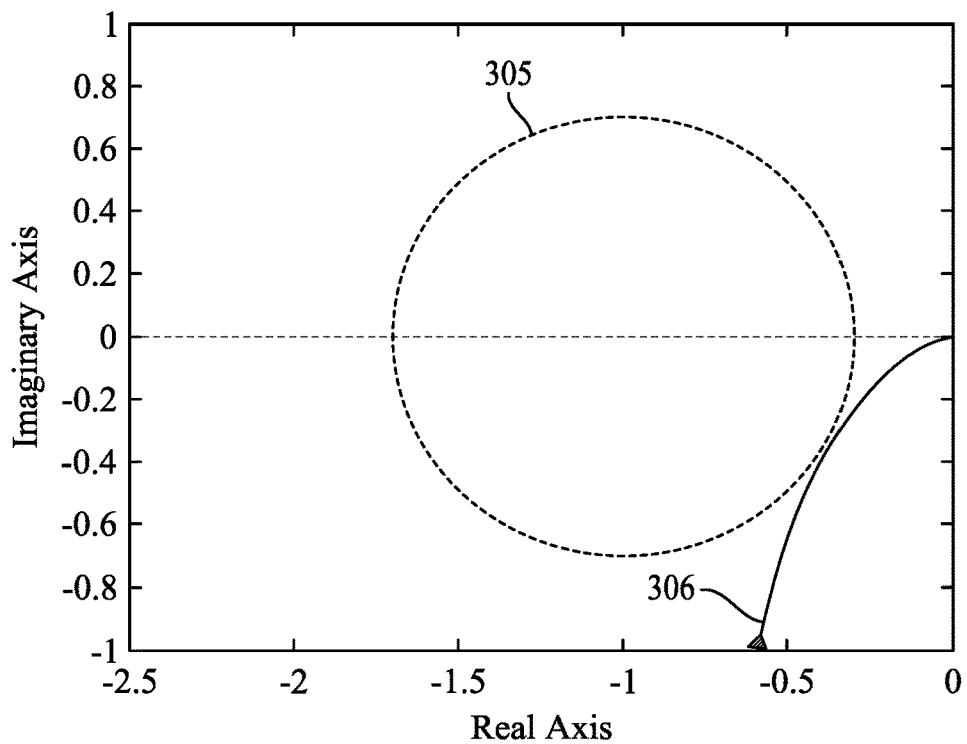
FIG. 3D illustrates an open loop frequency response of the plant, according to certain embodiments.

FIG. 3D illustrates an open loop frequency response of the plant 102-1. A curve 306 indicates that the frequency response of the plant 102-1 at the new set of tuning parameters was outside a circle 305 of radius 0.7. Thus, the behavior of the plant 102-1 was stable.

Figure 3E:
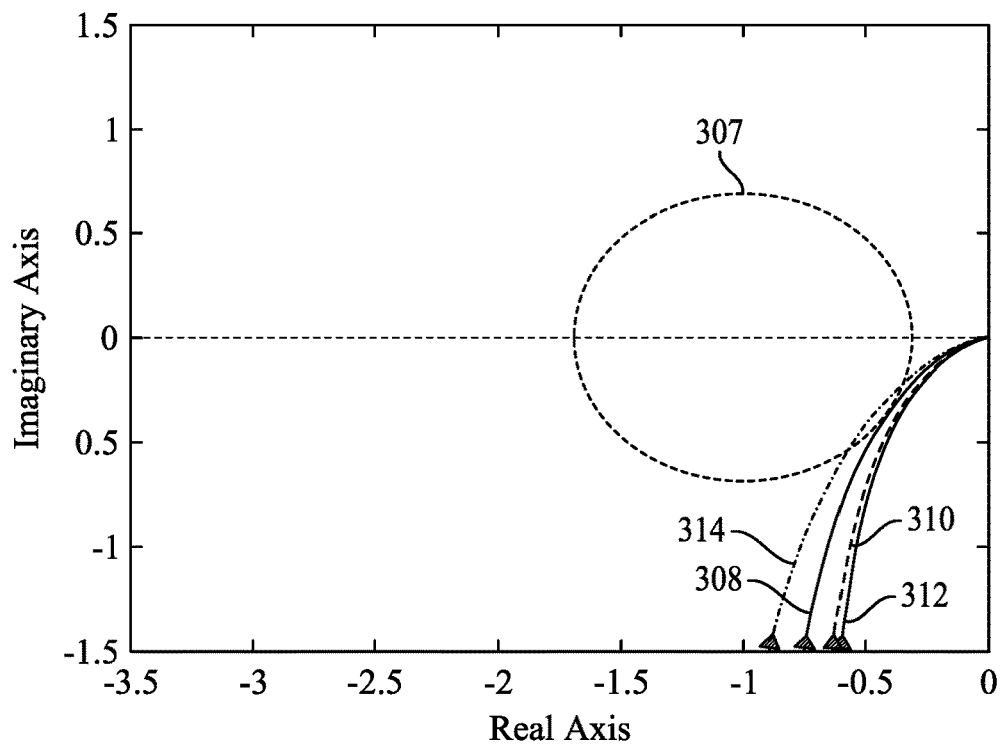
FIG. 3E illustrates the open loop frequency response of the plant for different values of delay, according to certain embodiments.

FIG. 3E illustrates open loop frequency response of the plant 102-1 for different values of delay. The delay of the plant 102-1 was varied manually for experimental observation and based on the tuning parameters, open loop frequency response of the plant 102-1 was analyzed. It was found that the open loop frequency response of the plant 102-1 was outside the circle 307 centered at −1 for which no intersection with the frequency response occurred for various delays. However, the radius of the circle 307 around −1 started shrinking after a delay of 0.3. It was calculated that if the delay in the plant 102-1 was in between 0.1 sec to 0.3 sec, the compensator 114 managed to generate a new set of tuning parameters and stabilize the output of the plant 102-1.

However, it was experimentally found that stabilizing the plant 102-1 after 0.6 sec delay was not possible even by modifying the tuning parameters. Curves 308, 310 and 312 indicate stable frequency responses of the plant 102-1 at different delays as the curves 308, 310 and 312 were outside the unit circle. However, a curve 314 indicates an intersection with the unit circle 307. Intersection of the curve 314 indicates an unstable response of the plant 102-1.

Figure 3F:
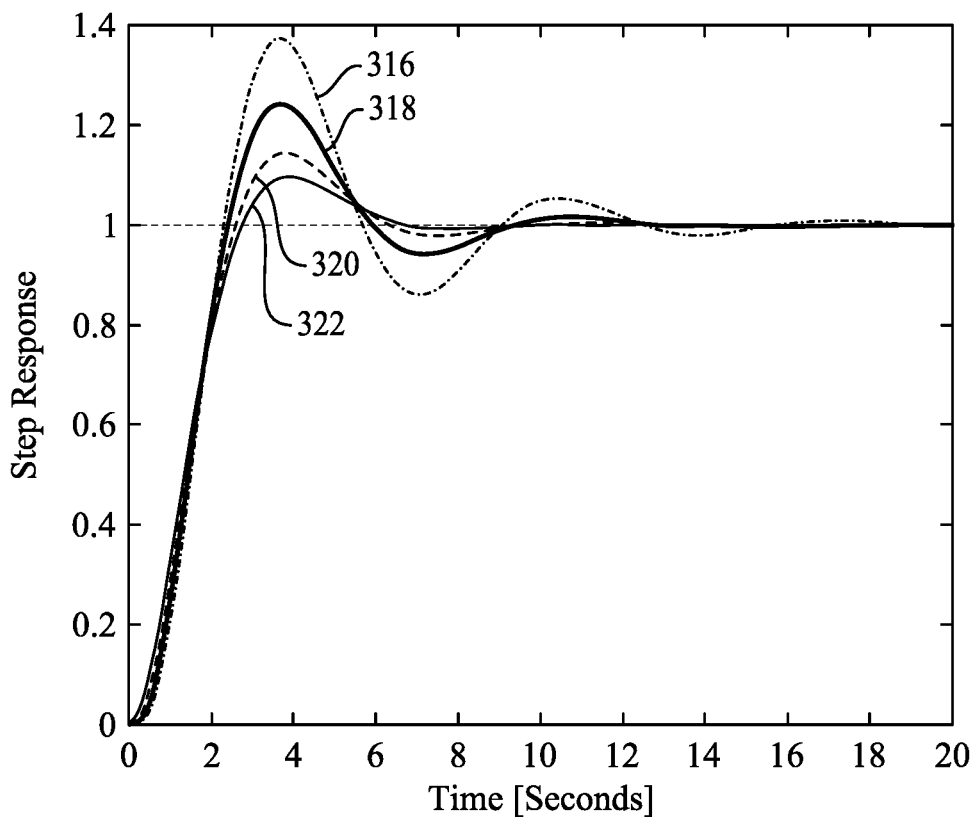
FIG. 3F illustrates a closed loop frequency response of the plant for the modified set of tuning parameters and different values of the delay, according to certain embodiments.

FIG. 3F illustrates a closed loop frequency response of the plant 102-1 at the modified set of tuning parameters for different values of the delay. Curves 316, 318, 320 and 322 illustrate the closed loop frequency response of the plant 102-1 at delay 0.3 sec, 0.2 sec, 0.1 sec and 0.0 sec, respectively. It was concluded that as the delay get higher, the overshoot and the settling time of the plant 102-1 gets higher.

Figure 4A:
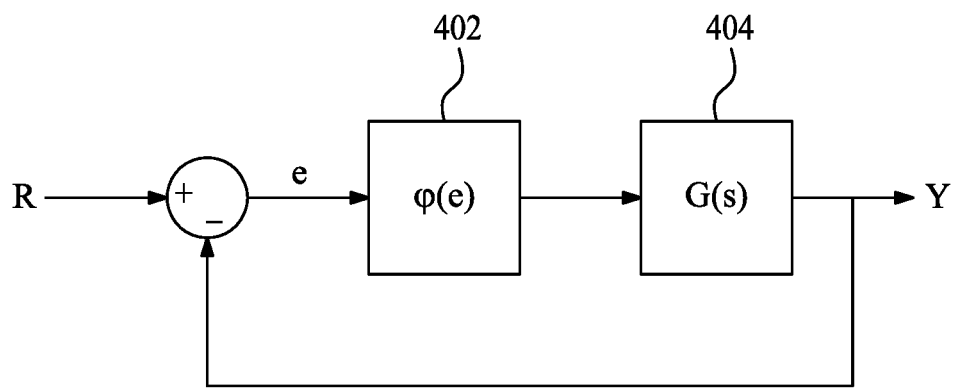
FIG. 4A illustrates a cascaded system, when the plant experiences a non-linearity, according to certain embodiments.
Figure 4B:
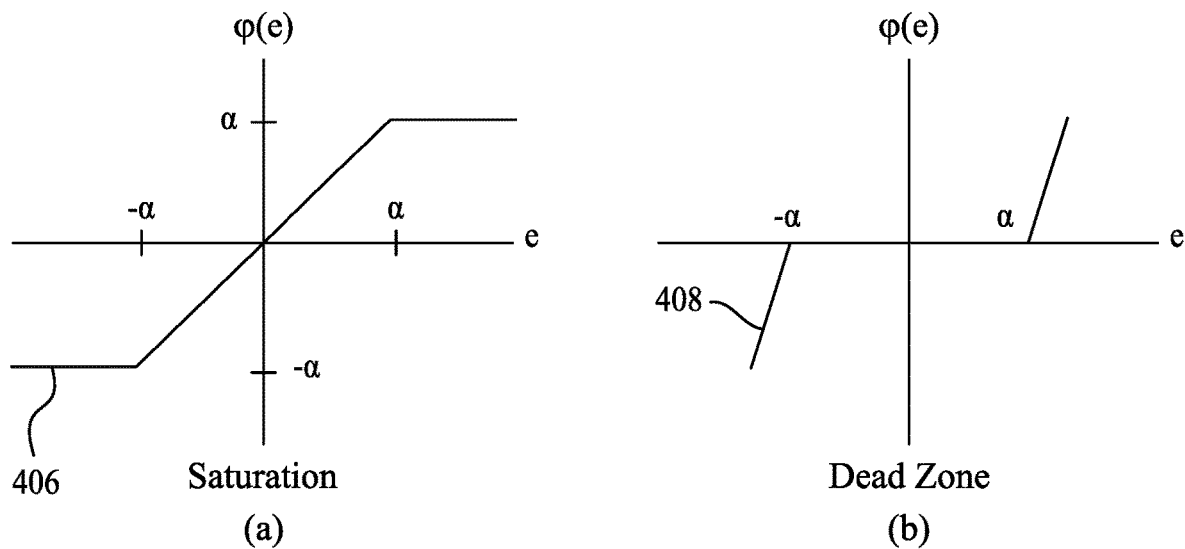
FIG. 4B(a) illustrates a graphical representation of a saturation condition in the plant, according to certain embodiments.

FIG. 4A illustrates a behavior of the plant 102-1 cascaded with the compensator 114 when the plant 102-1 experiences a non-linearity, according to an aspect. The nonlinearities may include actuator saturation, dead zone, backlash, or a variable gain. For example, the actuator saturation may be assumed as a condition when the output of the plant 102-1 becomes constant for a defined range of another parameter. Similarly, the dead zone may be assumed as a condition when the output of the plant 102-1 becomes null for certain values of another parameter. The actuator saturation is shown by curve 406 in FIG. 4B(a). The dead zone is illustrated graphically through curve 408, as shown in FIG. 4B(b). The plant 102-1 may include a first block 402 that produces a nonlinearity as the actuator saturation or the dead zone. The first block 402 may be referred to as a nonlinear block 402 that produces the non-linearity. The combined transfer function of the plant 102-1 and the compensator 114 may be represented as a second block 404 (G(s)). For the plant 102-1 to remain stable even in the presence of non-linearity, frequency response of the system should be outside of the unit circle.

Figure 4C:
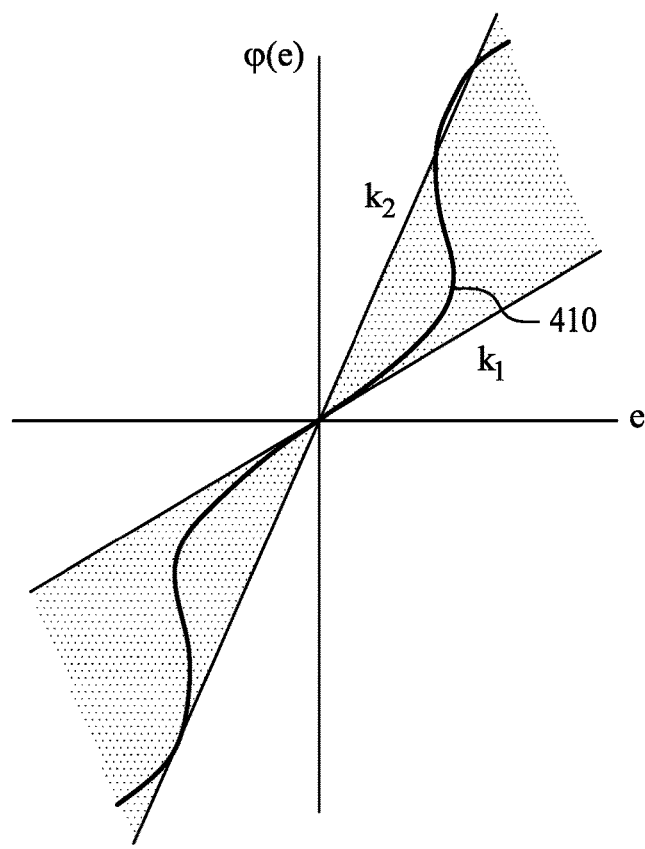
FIG. 4C illustrates a variable amplitude curve as a non-linearity, according to certain embodiments.

FIG. 4C illustrates a variable amplitude curve as a non-linearity. The nonlinear block 402 may induce a non-linearity in the form of variable amplitude. For example, a curve 410 may represent a variable amplitude of the signal that is induced in the plant 102-1. The variable amplitude signal may have positive slopes as $k_1$ and $k_2$, respectively. The amplitude of the curve 410 varies within slopes $k_1$ and $k_2$. In the example, the amplitudes of slopes $k_1$ and $k_2$ were selected as 1 and 0.5, respectively.

Figure 4D:
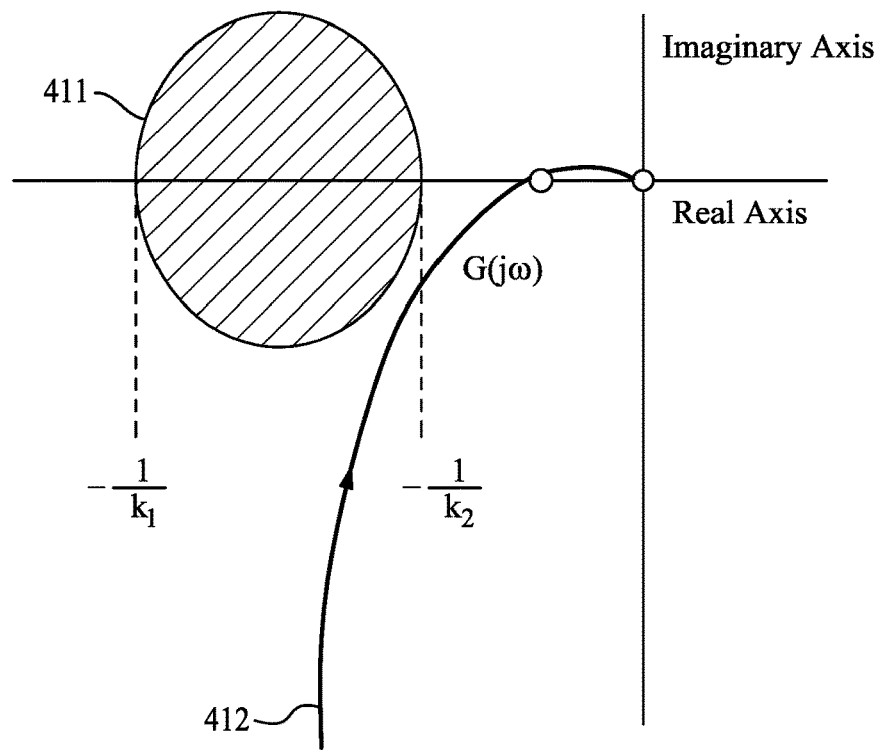
FIG. 4D illustrates an open loop frequency response of a nonlinear system, according to certain embodiments.

FIG. 4D illustrates an open loop frequency response of the nonlinear block 402. The nonlinear block 402 is described in FIG. 4A and is referred herein for explanations. For the frequency response of the nonlinear block 402 to remain stable, a frequency response curve 412 of the nonlinear block 402 must fall outside circle 411 bound by $(-1/k_1)$ and $(-1/k_2)$. In an exemplary aspect, the plant 102-1 which is part of the second block 404 may have a transfer function as given by:

$$G_2(S) = \frac{1}{S^2} \cdot e^{-T \cdot S}.$$

The plant 102-1 is cascaded with the second order compensator 114 that has a transfer function as:

$$G_c(S, P1, Z1, P2, Z2) = \frac{S+Z1}{S+P1} \cdot \frac{S+Z2}{S+P2}.$$

Accordingly, the overall transfer function of the plant 102-1 and the compensator 114 can be provided as:

$$G(S) = \frac{S+Z1}{S+P1} \cdot \frac{S+Z2}{S+P2} * \frac{1}{S^2} \cdot e^{-T \cdot S}.$$

The non-linearity as induced by the first block 402, was assumed as:

$$\varphi(x) = \frac{3 \cdot x + x \cdot \sin(5 \cdot x)}{4}.$$

As the nonlinear block 402 and the second block 404 are connected in series, the overall transfer function is represented as:

$$G(S) = \frac{S+Z1}{S+P1} \cdot \frac{S+Z2}{S+P2} * \frac{1}{S^2} \cdot e^{-T \cdot S} * \frac{3 \cdot x + x \cdot \sin(5 \cdot x)}{4}.$$

Since the plant 102-1 was experiencing a delay at its output as well as nonlinearity, the output of the plant 102-1 is unstable. The compensator 114 was introduced to stabilize the output of the plant 102-1 to stabilize the output. Initially a set of L tuning parameters with values $P_1=0.1$, $Z_1=1$, $P_2=0.2$, $Z_2=0.9$ were applied which produced an unstable response.

Figure 4E:
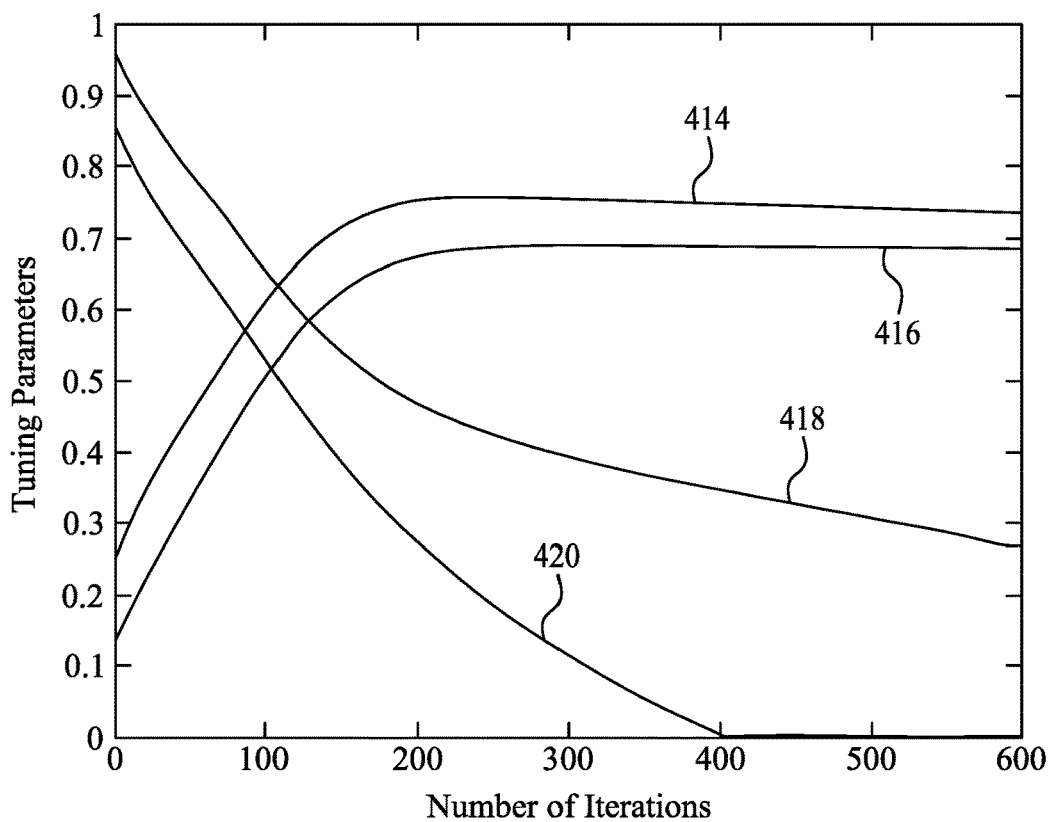
FIG. 4E illustrates evolution of the tuning parameters over the number of iterations for the system having non-linearity, according to certain embodiments.

FIG. 4E illustrates the evolution curves of the tuning parameters for the system having non-linearity. The set of tuning parameters was received at the interface 110-1 of the controller 104-1. The compensator 114 determined a new set of tuning parameters. The new set of tuning parameters is illustrated as a curve 414 for a new value of the pole $P_2$, a curve 416 for a new value of the pole $P_1$, a curve 418 for a new value of the zero $Z_1$ and a curve 420 for a new value of the zero $Z_2$ that converged at $Z_1=0.2661$, $P_1=0.6858$, $Z_2=0$, $P_2=0.7368$, respectively.

Figure 4F:
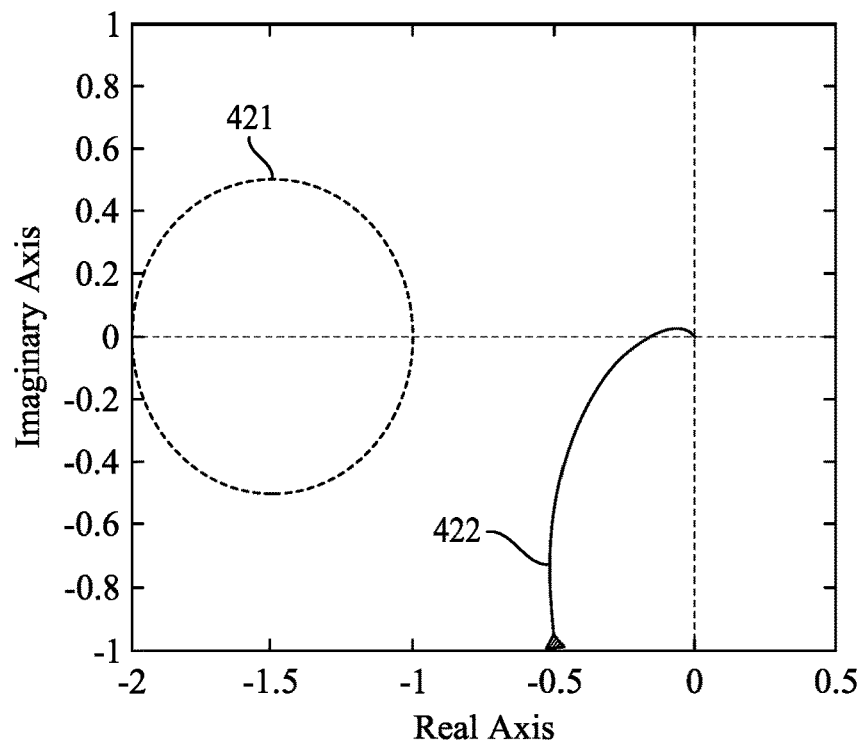
FIG. 4F illustrates an open loop transfer function of the plant, based on the new set of tuning parameters, according to certain embodiments.

FIG. 4F illustrates the open loop transfer function of the plant 102-1 and the compensator 114, based on the new set of tuning parameters. A curve 422 indicates a frequency response of the plant 102-1 and the compensator 114. The curve 422 is far away from the stability circle (shown as dashed circle). Accordingly, with the new set of tuning parameters, the response of the plant 102-1 was found stable.

Figure 4G:
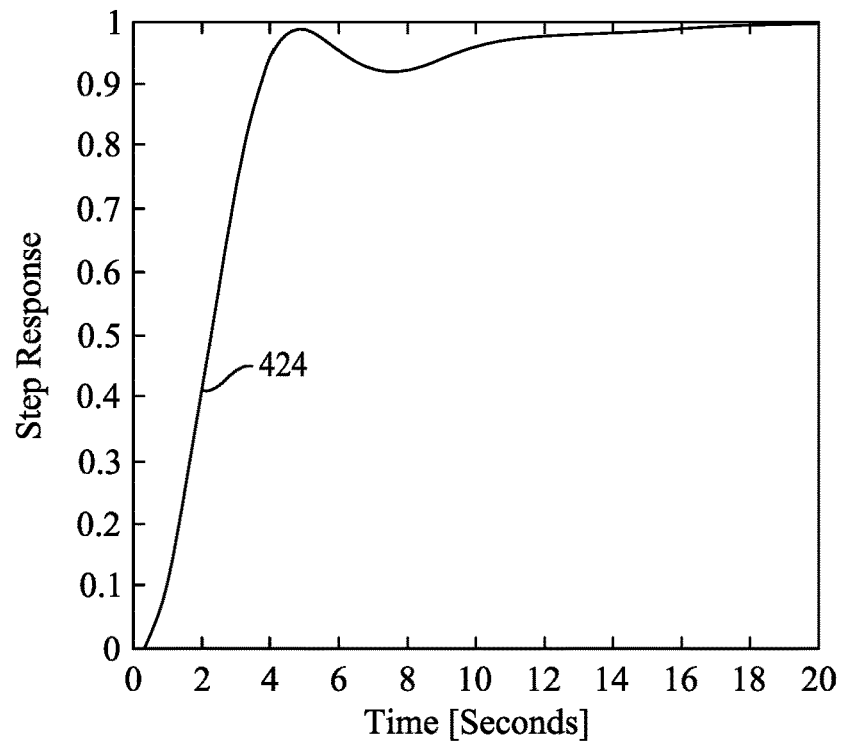
FIG. 4G illustrates a closed loop transfer function of the plant, based on the new set of tuning parameters, according to certain embodiments.

FIG. 4G illustrates the closed loop transfer function of the plant 102-1 and the compensator 114, based on the new set of tuning parameters. A curve 424 illustrates the frequency response of the plant 102-1 and the compensator 114 at the step input. The curve 424 indicated a stable output of the plant 102-1 even if the plant 102-1 experienced a non-linearity issue. At the new set of tuning parameters, the response of the plant 102-1 was found stable.

Figure 5A:
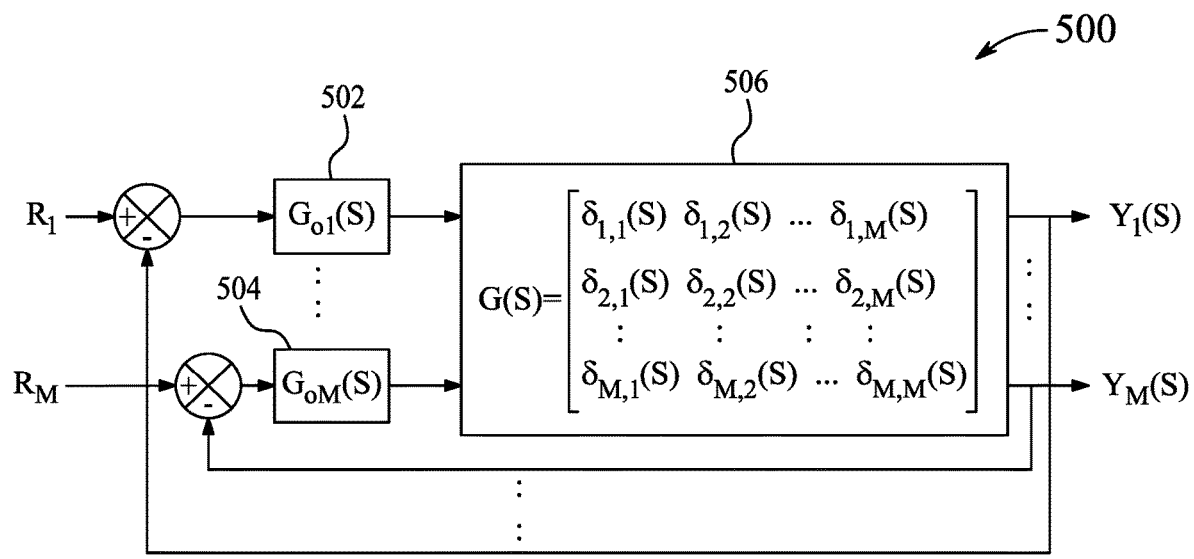
FIG. 5A illustrates a MIMO system with a decentralized control of the plant outputs, according to certain embodiments.

FIG. 5A illustrates a MIMO system 500 with the decentralized control of the output of the plants. The modification technique of the tuning parameters as disclosed is applied to the MIMO system 500. The MIMO system 500 includes M inputs ($R_i$), M outputs ($Y_i$) and M number of controllers 502, 504, etc. for stabilizing the MIMO system 500 (where M is an integer). A matrix transfer function block 506 representing the system compensator constitutes a system model that relates all the M number of inputs to the M number of outputs. Although shown as solid lines, the controllers 502 may wirelessly communicate with the matrix transfer function block 506. A component $g_{i,j}(S)$ relates the $i^{th}$ control input to the $j^{th}$ system output. The relation can be represented as:

$$\begin{bmatrix} Y_1(S) \\ \vdots \\ Y_M(S) \end{bmatrix} = G(S) \begin{bmatrix} U_1(S) \\ \vdots \\ U_M(S) \end{bmatrix},$$

or $$Y_j(S) = g_{i,j}(S) U_i(S),$$

where $G_{ci}(S)$ represents the transfer function of the controller 502 acting on the $i^{th}$ input to provide it with a control signal and $R_i$ is the reference input or the set point, where each of $U_i(S)$ could be represented as:

$$U_i(S) = G_{ci}(S, \Lambda_i) \cdot (R_i - Y_i(S)),$$

where S represents the complex plane, Λ indicates the tuning parameter space vector, $R_i$ indicates the set point applied at the M number of inputs, and $Y_i(S)$ indicates the M number of output.

Accordingly, the controllers 502 and 504 generate the $i^{th}$ control signal by acting on the error corresponding to the $i^{th}$ output. The error can be represented as ($R_i - Y_i(S)$).

An equivalent forward transfer function (EFTF), $Q_i(S)$ that connects an error channel $E_i(S)$ to the corresponding output $Y_i(S)$ can be represented as:

$$Q_i(S) = \left[ g_{i,i}(S) - \sum_{\substack{j=1 \\ j \neq i}}^{M} G_{cj}(S, \Lambda_j) \cdot g_{i,j}(S) \cdot g_{j,i}(S) \right] \cdot G_{c_i}(S, \Lambda_i)$$

$$i = 1, \ldots M.$$

If $G_{ci}(S, \Lambda i)$ (i=1, . . . , M) is determined such that the individual compensated frequency response of each $Q_i(S)$ outside the unit circle having center is −1 on the real axis, the MIMO system 500 can be stabilized in a decentralized manner.

For example, a 2 input and 2 output MIMO system 500 is considered. The transfer function G(s) of the MIMO is represented by:

$$G(s) = \begin{bmatrix} \frac{1}{s^3} & \frac{1}{S^2} \\ \frac{1}{S} & \frac{e^{-0.2 \cdot S}}{s^2} \end{bmatrix}.$$

In an aspect, a second order controller (two poles and two zeros) is used at each input to stabilize the MIMO system 500. The transfer functions of the controllers 502 are computed for the first and second error channels and are represented as:

$$G_{c1}(S) = \frac{S+.05}{S+1.272} \cdot \frac{S+.05}{S+1.302},$$

$$G_{c2}(S) = \frac{S+.05}{S+1.34} \cdot \frac{S+.05}{S+1.35}.$$

Accordingly, the EFTF is computed as given below:

$$Q_1(S) = \left[\frac{1}{S^3} - \frac{G_{C2}(S)}{S^3}\right] \cdot G_{c1}(S),$$

$$Q_2(S) = \left[\frac{e^{-0.2S}}{S^2} - \frac{G_{C1}(S)}{S^3}\right] \cdot G_{c2}(S).$$

Figure 5B:
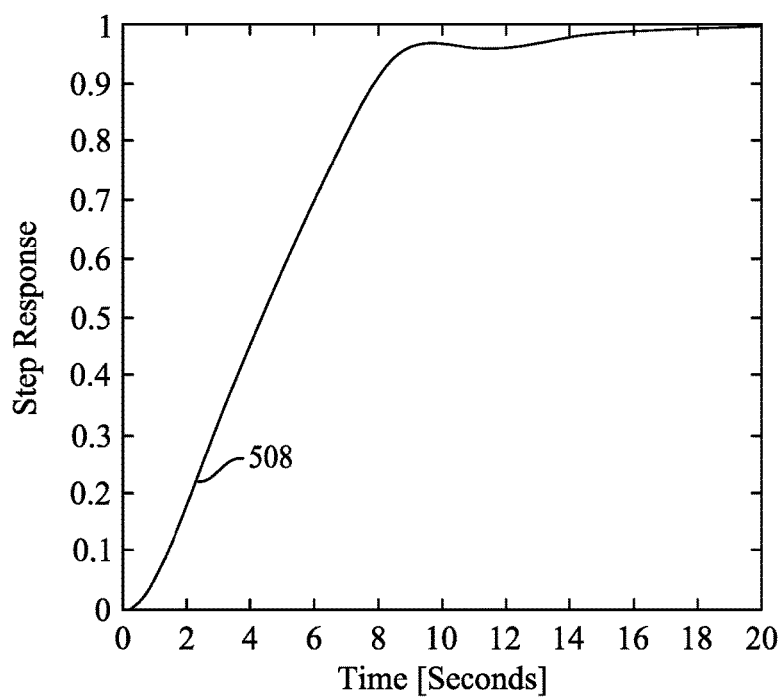
FIG. 5B illustrates a closed loop frequency response of a MIMO system having non-linearity, according to certain embodiments.

FIG. 5B illustrates a closed loop frequency response of the MIMO system 500 experiencing non-linearity due to an actuator saturation. A curve 508 indicates the closed loop step response of the MIMO system 500. Thus, it is clear that that the MIMO system 500 could provide a stable output to the plant even if nonlinearity is introduced in the MIMO system 500.

Figure 5C:
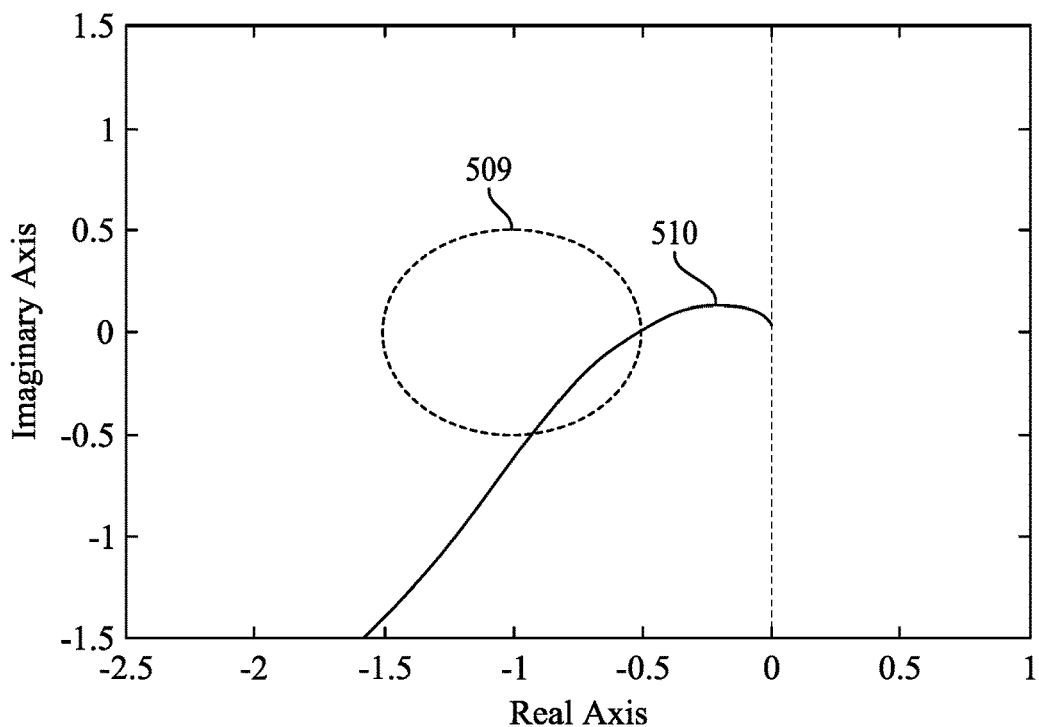
FIG. 5C illustrates an open loop frequency response of an equivalent forward transfer function (EFTF)-1, according to certain embodiments.

FIG. 5C illustrates an open loop frequency response of the EFTF-1, according to an aspect. The EFTF-1 corresponds to $Q_1(S)$. A curve 510 indicates that the open loop response of the MIMO system 500 is passing through a unit circle 509. Accordingly, the EFTF-1 corresponding the $Q_1(S)$ is unstable.

Figure 5D:
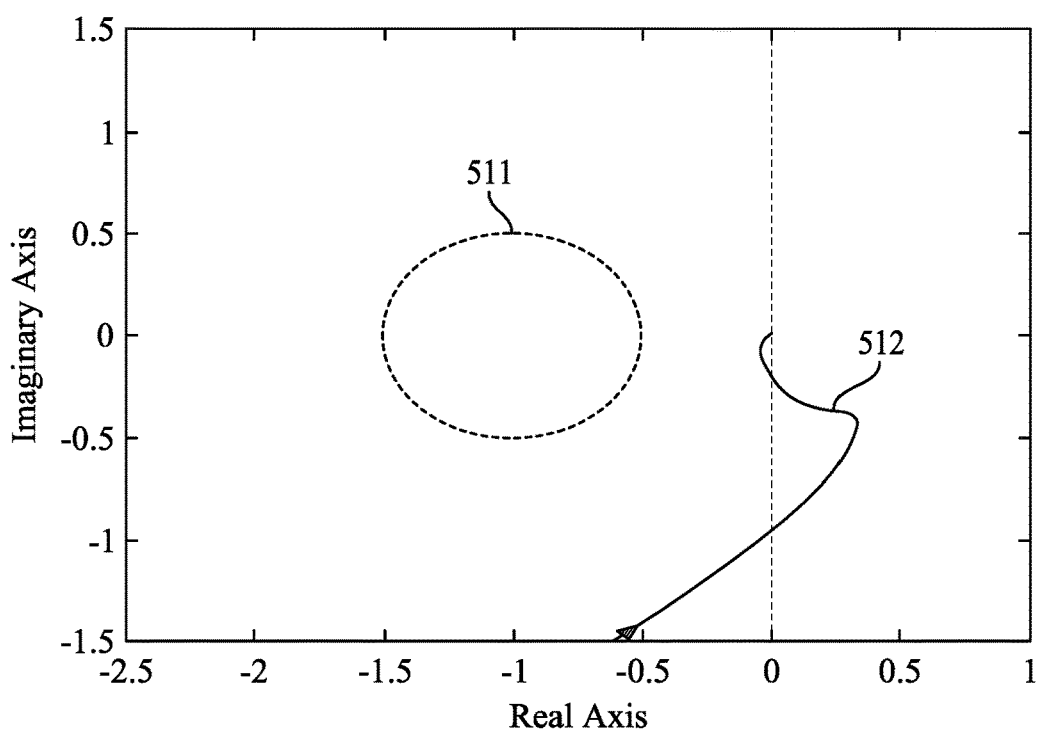
FIG. 5D illustrates an open loop frequency response of an EFTF-2, according to certain embodiments.

FIG. 5D illustrates an open loop frequency response of the EFTF-2, according to an aspect. The EFTF-2 corresponds to $Q_2(S)$. A curve 512 indicates that the open loop response of the MIMO system 500 is not passing through a unit circle 511. The points of frequency response are far away from the unit circle, thereby making the EFTF-2 corresponding the $Q_2(S)$ is stable.

Figure 5E:
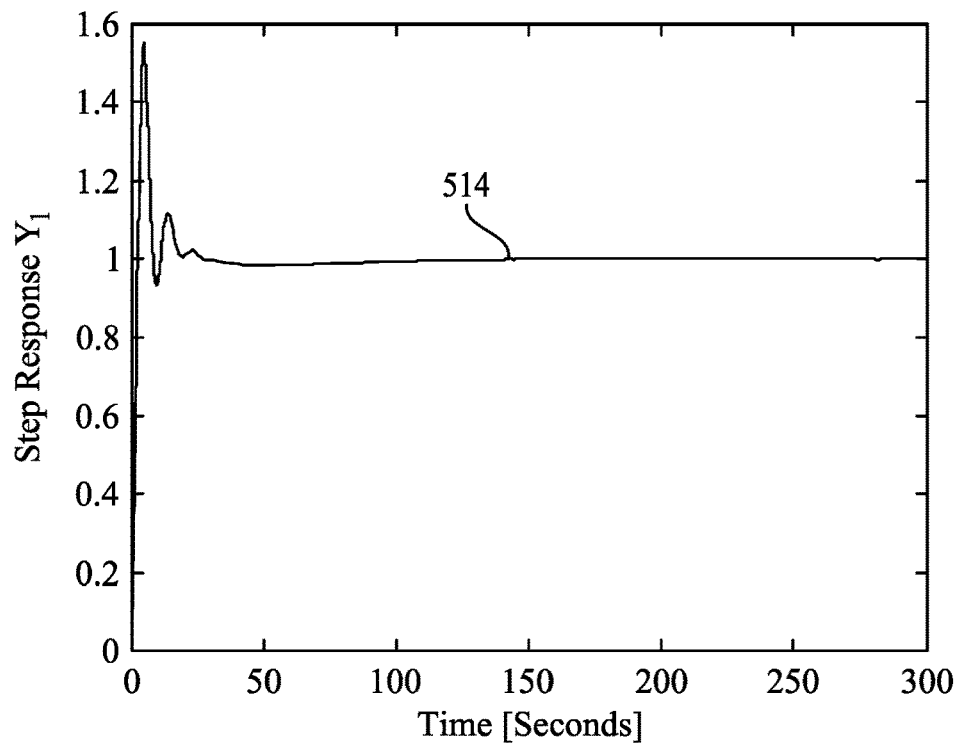
FIG. 5E illustrates a closed loop step response of the output from the MIMO system, according to certain embodiments.

FIG. 5E illustrates a closed loop step response of the output ($Y_1$) from the MIMO system 500, according to an aspect. A curve 514 indicates a stable step response at the output $Y_1$ of the MIMO system 500.

Figure 5F:
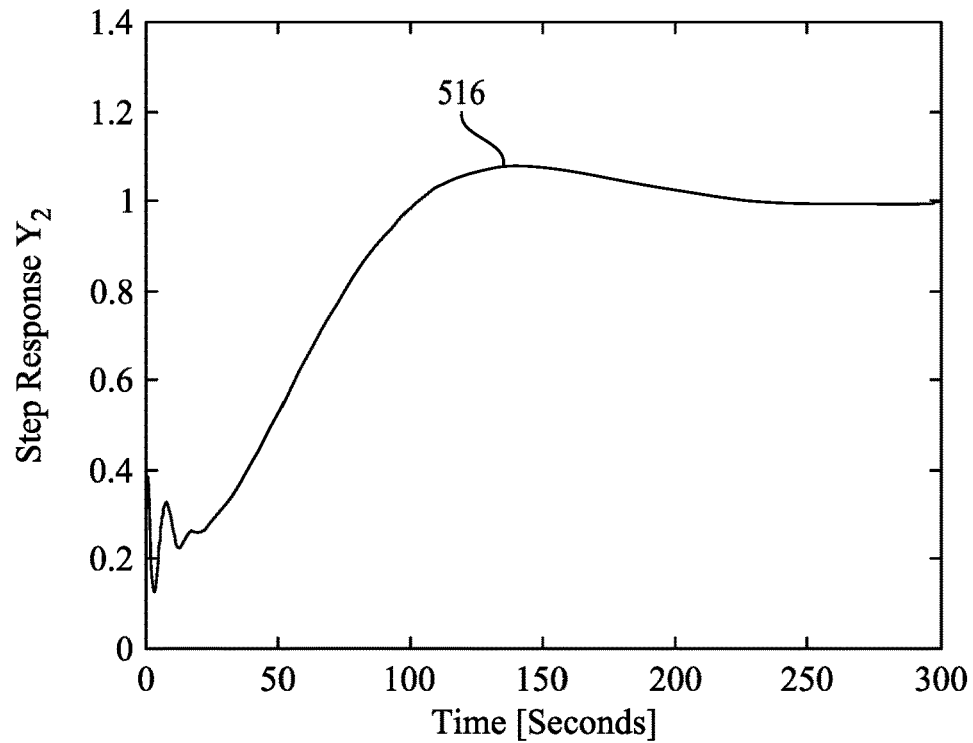
FIG. 5F illustrates a closed loop step response of another output from the MIMO system, according to certain embodiments.

FIG. 5F illustrates a closed loop step response of the output ($Y_2$) from the MIMO system 500, according to an aspect. A curve 516 indicates a stable step response at the output $Y_2$ of the MIMO system 500.

The first embodiment is illustrated with respect to FIG. 1G-FIG. 5F. The first embodiment describes a system 150 for decentralized control of decoupled plants 102-1 to 102-N. The system 150 includes N decoupled plants 102-1 to 102-N, wherein each decoupled plant 102-1 to 102-N includes at least a motor $102\text{-}M_1\text{-}102M_N$ and a load $102\text{-}L_1\text{-}102L_N$; N controllers 104-1 to 104-N, wherein each controller 104-1 to 104-N is connected in series with a corresponding decoupled plant 102-1 to 102-N; wherein each controller$_i$, for i=1, 2, ..., N, includes an adder, $A_i$, $108_i$ having a first input configured receive a set point signal, $SP_i$, wherein the set point signal has a frequency, $\omega_i$, a second input configured to receive a negative feedback signal from at a respective plant output, $PO_i$, wherein the adder, $A_i$, $108_i$ is configured to add the set point signal, $SP_i$, to the negative feedback signal, and generate an error signal, $E_i$; a controller interface 110-1 to 110-N configured to receive a set of L tuning parameters; a controller circuitry 112-1 to 112-N including a non-transitory computer readable medium including program instructions and one or more processors configured to use the program instructions to modify the error signal $E_i$, a frequency domain assessment function, $Q(\omega, \Lambda)$ and a set of L tuning parameters and generate drive signals. The system 150 further includes a compensator 114 connected to the decoupled plants 102, wherein the compensator 114 is configured to sample the error signals, $E_i$, and the plant outputs, $PO_i$; perform a Fourier transform of the error signals, $E_i$, to transform the error signals, $E_i$, to a frequency domain; generate the tuning parameter space vector, $\Lambda$, given by $\Lambda=[\gamma_1 \ \gamma_2 \ \ldots \ \gamma_L]^T$, where $\gamma$ represents an ith tuning parameter and T represents a transpose, based on a frequency domain assessment function, $Q(\omega, \Lambda)$, where $Q(\omega, \Lambda)$ is a subset of an admissible region, $\Psi$, in the frequency domain; obtain the set of L tuning parameters from the tuning parameter space vector, $\Lambda$; and transmit the frequency domain assessment function, $Q(\omega, \Lambda)$ and the set of L tuning parameters to each controller interface 110-1 to 110-N of each plant 102-1 to 102-N.

In an aspect, the system 150 further includes a system adder $A_s$, $108_s$, configured to receive the set point signals, $SP_i$, from each plant, for each i=1 to N, subtract a system output and generate system error signals, $E_s$.

In an aspect, the system 150 further includes a compensator interface 114-I configured to: receive the system error signals, $E_s$, receive a set of initial values of the L tuning parameters, and receive the frequency domain assessment function, $Q(\omega,\Lambda)$, for all $\omega$.

In an aspect, the system 150 further includes the compensator 114 connected to the compensator interface 114, the compensator 114 including computing circuitry, one or more processors, H, and a non-transitory computer readable medium configured to store program instructions that, when executed by the one or more processors, H, cause the processors to perform a Fourier transform of the error signals, $E_s$, to transform the error signals, $E_s$, to the frequency domain.

In an aspect, the compensator 114 is further configured to: determine a virtual action, F, which populates a virtual region, $\Lambda$, in a complex plane, C, of the frequency domain having a set of points, P, where the virtual region $\Gamma=(C-\Psi)$, wherein the virtual action, F, maps each point, P, in the complex plane to a force, F(P), such that $C \rightarrow R^2$, where $F(P)=[F_r(P) \ F_i(P)]^T$, where $R^2$ is a two-dimensional real number plane, and $F_r$ and $F_i$ are real and imaginary components of F, respectively, wherein the force, F(P), is configured to drive any point, P, in the virtual region, $\Gamma$, to a point in the admissible region, $\Psi$, and where the virtual action, F, is zero in the admissible region, $\Psi$.

In an aspect, the compensator 114 is further configured to: generate a sampling frequency vector, $\Omega$, where $\Omega=[\omega_1, \omega_2, \ldots, \omega_N]^T$; apply the sampling frequency vector, $\Omega$, to the force, F(P); generate a force vector, F($\Omega$); determine that the compensator 114 is in compliance with a set of constraints when $|F(\Omega)|=0$; and determine that the compensator 114 is not in compliance with the set of constraints when $|F(\Omega)|>0$.

In an aspect, the compensator 114 is further configured to when in compliance with the set of constraints, generate an L-dimensional state space, $\Lambda(\mathcal{L})$, having coordinates equal to each coordinate of the tuning parameter space vector, $\Lambda$; and generate an L-dimensional image subspace, $\mathcal{F}(\Lambda)$, based on the L-dimensional state space, $\Lambda(\mathcal{L})$.

In an aspect, the compensator 114 is further configured to: construct an extended Jacobian matrix, $J_\Omega(\Omega)$, at each sampling frequency; construct a complete orthonormal set of vectors tangent to $\mathcal{F}(\Lambda)$ from each column of the extended Jacobian matrix, $J_\Omega(\Omega)$; project the force vector, F($\Omega$), on $\mathcal{F}_\Lambda$, such that $\mathcal{F}_\Lambda = J_\Omega^T(\Omega) \ F_\Omega(\Omega)$.

In an aspect, the compensator 114 is further configured to: calculate $\dot{\Lambda}=J_\Omega^T(Q(\Omega,\Lambda)))F_\Omega(Q(\Omega,\Lambda))$ for $\Lambda(0)=\Lambda_0$, wherein $\dot{\Lambda}$ is a change in the tuning parameter space vector, $\Lambda$; and integrate $\dot{\Lambda}$ to obtain the tuning parameter space vector, $\Lambda$.

The second embodiment is illustrated with respect to FIG. 1G-FIG. 5F. The second embodiment describes a method for determining controller tuning parameters for a system 150 of decoupled controllers 104-1 to 104-N. The method includes receiving, by a first input of an adder, $A_i$,

108, $A_i$, in series with a controller 104-1 to 104-N, $CT_i$, for i=1, 2, ..., N, a set point signal, $SP_i$, wherein the set point signal has a frequency, $\omega_i$. The method further includes receiving, by a second input of the adder $A_i$, 108$_i$, a negative feedback signal of a plant output, $PO_i$. The method further includes adding, by the adder 108$_i$, $A_i$, the set point signal, $SP_i$, to the negative feedback signal and generating an error signal, $E_i$. The method further includes receiving, at an interface 110-1 to 110-N of each controller 104-1 to 104-N, $CT_i$, a set of L tuning parameters. The method further includes receiving, at the interface 110-1 to 110-N of each controller 104-1 to 104-N, $CT_i$, a frequency domain assessment function, $Q(\omega, \Lambda)$. The method further includes performing, by a controller circuitry 112-1 to 112-N located in each controller 104-1 to 104-N, $CT_i$, the controller circuitry 112-1 to 112-N including a non-transitory computer-readable medium, $CRM_i$, including program instructions, $PI_i$, and one or more processors, $PR_i$, configured to use the program instructions, the steps of modifying the error signal, Ei, based on the tuning parameter space vector, $\Lambda$; generating drive signals; transmitting the drive signals to a plant 102, $B_i$, connected in series with the controller 104-1 to 104-N, $CT_i$; actuating, with the drive signals, motor 102-$M_1$-102-$M_N$, $G_i$, located within the plant 102-1 to 102-N, $B_i$, operating, by the motor 102-$M_1$-102-$M_N$, $G_i$, load 102-$L_1$-102-$L_N$, $D_i$; and generating the plant output, $PO_i$. The method further includes sampling, by an adder, $A_s$, 108 connected to the system of decoupled controllers 104-1 to 104-N, the set point signals, $SP_i$, from each plant 102-1 to 102-N, for each i=1 to N, and the plant outputs, $PO_i$. The method further includes performing, by a compensator 114 connected to the adder, $A_s$, 108, a Fourier transform of the set point signals, $SP_i$, which transforms the set point signals, $SP_i$, to a frequency domain. The method further includes receiving, by a compensator interface 114-I of the compensator 114, a frequency domain assessment function, $Q(\omega, \Lambda)$, where $Q(\omega, \Lambda)$ is a subset of an admissible region, $\Psi$, in the frequency domain. The method further includes generating, by the compensator 114, a tuning parameter space vector, $\Lambda$, given by $\Lambda=[\gamma_1 \; \gamma_2 \; \ldots \; \gamma_L]^T$, where $\gamma$ represents an $i^{th}$ tuning parameter, and T represents a transpose, based on the frequency domain assessment function, $Q(\omega, \Lambda)$. The method further includes obtaining the L tuning parameters from the tuning parameter space vector, $\Lambda$. The method further includes transmitting, by a transmitter connected to the compensator 114, the frequency domain assessment function, $Q(\omega, \Lambda)$ and the L tuning parameters to each controller interface 110-1 to 110-N of each controller 104-1 to 104-N, $CT_i$, of the system 150 of decoupled controllers 104-1 to 104-N.

In an aspect, the method further includes, during a sampling period, receiving, at a first input of the adder, $A_s$, 108 the set point signals, $SP_i$, from each plant 102-1 to 102-N, for each i=1 to N; receiving, at a second input of the adder, $A_s$, 108 the plant output signals, $PO_i$; and generating, at an output of the adder, $A_s$, 108 system error signals, $E_s$.

In an aspect, the method further includes receiving, by the compensator interface 114-I the system error signals, $E_s$, a set of initial values of the L tuning parameters, and the frequency domain assessment function, $Q(\omega,\Lambda)$, for all $\omega$.

In an aspect, the method further includes performing, by the compensator 114, wherein the compensator 114 includes computing circuitry, one or more processors, H, and a non-transitory computer readable medium, CRMs, configured to store program instructions, PIs, that, when executed by the one or more processors, H, performs a Fourier transform of the error signals, $E_s$, to transform the error signals, $E_s$, to the frequency domain.

In an aspect, the method further includes determining, by the compensator 114, a virtual action, F, which populates a virtual region, $\Gamma$, in a complex plane, C, of the frequency domain having a set of points, P, where the virtual region $\Gamma=(C-\Psi)$, wherein the virtual action, F, maps each point, P, in the complex plane to a force, F(P), such that $C\rightarrow R^2$, where $F(P)=[F_r(P) \; F_I(P)]^T$, where $R^2$ is a two-dimensional real number plane, and $F_r$ and $F_I$ are real and imaginary components of F, respectively, wherein the force, F(P), is configured to drive any point, P, in the virtual region, $\Gamma$, to a point in the admissible region, $\Psi$, and where the virtual action, F, is zero in the admissible region, $\Psi$.

In an aspect, the method further includes generating, by the compensator 114, a sampling frequency vector, $\Omega$, where $\Omega=[\omega_1, \omega_2, \ldots, \omega_N]^T$. The method further include applying, by the compensator 114, the sampling frequency vector, $\Omega$, to the force, F(P). The method further includes generating, by the compensator 114, a force vector, $F(\Omega)$. The method further includes determining that the compensator 114 is in compliance with a set of constraints when $|F(\Omega)|=0$; and determining that the compensator 114 is not in compliance with the set of constraints when $|F(\Omega)|>0$.

In an aspect, the method further includes generating an L-dimensional state space, $\Lambda(\mathcal{L})$, having coordinates equal to each coordinate of the tuning parameter space vector, $\Lambda$, when the compensator 114 is in compliance with the set of constraints. The method further includes generating an L-dimensional image subspace, $\mathcal{F}(\Lambda)$, based on the L-dimensional state space, $\Lambda(\mathcal{L})$.

In an aspect, the method further includes constructing, by the compensator 114, an extended Jacobian matrix, $J_\Omega(\Omega)$, at each sampling frequency. The method further includes constructing, by the compensator 114, a complete orthonormal set of vectors tangent to $\mathcal{F}(\Lambda)$ from each column of the extended Jacobian matrix, $J_\Omega(\Omega)$. The method further includes projecting, by the compensator 114, the force vector, $F(\Omega)$, on $\mathcal{F}_\Lambda$, such that $\mathcal{F}_\Lambda=J_\Omega^T(\Omega) F_\Omega(\Omega)$.

In an aspect, the method further includes calculating $\dot{\Lambda}=J_\Omega^T(Q(\Omega,\Lambda)))F_\Omega(Q(\Omega,\Lambda)$ for $\Lambda(0)=\Lambda_0$, wherein $\dot{\Lambda}$ is a change in the tuning parameter space vector, $\Lambda$. The method further includes integrating $\dot{\Lambda}$ to obtain the tuning parameter space vector, $\Lambda$.

The third embodiment is illustrated with respect to FIG. 1G-FIG. 5F. The third embodiment describes a non-transitory computer readable medium having instructions stored therein that, when executed by one or more processors of a compensator 114, cause the one or more processors to perform a method of determining controller tuning parameters for a system 150 of decoupled controllers 104-1 to 104-N each connected to a plant 102. The method includes sampling, by an adder, As, 114 connected to the system 150 of decoupled controllers 104-1 to 104-N, a set point signals, $SP_i$, from each plant 102-1 to 102-N and a set of plant outputs, $PO_i$, for each i=1 to N. The method further includes performing a Fourier transform of the set point signals, $SP_i$, which transforms the set point signals, $SP_i$, to a frequency domain. The method further includes receiving, at a compensator interface 114-I, a frequency domain assessment function, $Q(\omega, \Lambda)$, where $Q(\omega, \Lambda)$ is a subset of an admissible region, $\Psi$, in the frequency domain. The method further includes generating a tuning parameter space vector, $\Lambda$, given by $\Lambda=[\gamma_1 \; \gamma_2 \; \ldots \; \gamma_L]^T$, where $\gamma_i$ an ith tuning parameter and T represents a transpose, based on the frequency domain assessment function, $Q(\omega, \Lambda)$. The method further includes obtaining the L tuning parameters from the tuning parameter space vector, Λ. The method further includes transmitting, by a transmitter connected to the compensator 114, the frequency domain assessment function, Q(ω, Λ), and the L tuning parameters to each controller 104-1 to 104-N of the system 150 of decoupled controllers 104. The method further includes wherein each controller 104-1 to 104-N of the system 150 of decoupled controllers 104-1 to 104-N is configured for receiving the frequency domain assessment function, Q(ω, Λ), and the L tuning parameters. The method further includes modifying a feedback error signal $E_i$ based on the tuning parameter space vector, Λ. The method further includes generating drive signals based on the frequency domain assessment function, Q(ω, Λ) and the L tuning parameters for transmitting the drive signals to a plant 102-1 to 102-N connected in series with the controller 104-1 to 104-N. The method further includes actuating, with the drive signals, a motor 102-M located within the plant 102-1 to 102-N. The method further includes operating, by the motor $102\text{-}M_1\text{-}102\text{-}M_N$, a load $102\text{-}L_1\text{-}102\text{-}L_N$. The method further includes generating the plant output, $PO_i$.

In an aspect, the method further includes determining a virtual action, F, which populates a virtual region, Γ, in a complex plane, C, of the frequency domain having a set of points, P, where the virtual region Γ=(C−Ψ), wherein the virtual action, F, maps each point, P, in the complex plane to a force, F(P), such that C→$R^2$, where $F(P)=[F_r(P) \ F_I(P)]^T$, where $R^2$ is a two-dimensional real number plane, and $F_r$ and $F_I$ are real and imaginary components of F, respectively, wherein the force, F(P), is configured to drive any point, P, in the virtual region, Γ, to a point in the admissible region, Ψ, and where the virtual action, F, is zero in the admissible region, Ψ. The method further includes generating, by the compensator 114, a sampling frequency vector, Ψ, where $\Psi=[\omega_1, \omega_2, \ldots, \omega_N]^T$. The method further includes applying, by the compensator 114, the sampling frequency vector, Ω, to the force, F(P). The method further includes generating, by the compensator 114, a force vector, F(Ω). The method further includes determining that the compensator 114 is in compliance with a set of constraints when |F(Ω)|=0. The method further includes determining that the compensator 114 is not in compliance with the set of constraints when |F(Ω)|>0. The method further includes when the compensator 114 is in compliance with the set of constraints, generating an L-dimensional state space, Λ($\mathcal{L}$), having coordinates equal to each coordinate of the tuning parameter space vector, Λ. The method further includes generating an L-dimensional image subspace, $\mathcal{F}$(Λ), based on the L-dimensional state space, Λ($\mathcal{L}$). The method further includes constructing, by the compensator 114, an extended Jacobian matrix, $J_\Omega(\Omega)$, at each sampling frequency. The method further includes constructing, by the compensator 114, a complete orthonormal set of vectors tangent to $\mathcal{F}$(Λ) from each column of the extended Jacobian matrix, $J_\Omega(\Omega)$. The method further includes projecting, by the compensator 114, the force vector, F(Ω), on $\mathcal{F}_\Lambda$, such that $\mathcal{F}_\Lambda=J_\Omega^T(\Omega)F_\Omega(\Omega)$. The method further includes calculating $\dot{\Lambda}=J_\Omega^T(Q(\Omega,\Lambda)))F_\Omega(Q(\Omega,\Lambda))$ for $\Lambda(0)=\Lambda_0$, wherein $\dot{\Lambda}$ is a change in the tuning parameter space vector, Λ. The method further includes integrating $\dot{\Lambda}$ to obtain the tuning parameter space vector, Λ.

To this end, the disclosure provides an efficient method for designing decentralized controllers for distributed industrial plants. The method can efficiently reduce the communication lines for the decentralized controller in the plant as compared to the plants that use the designed central controller or the compensator.

Figure 6:
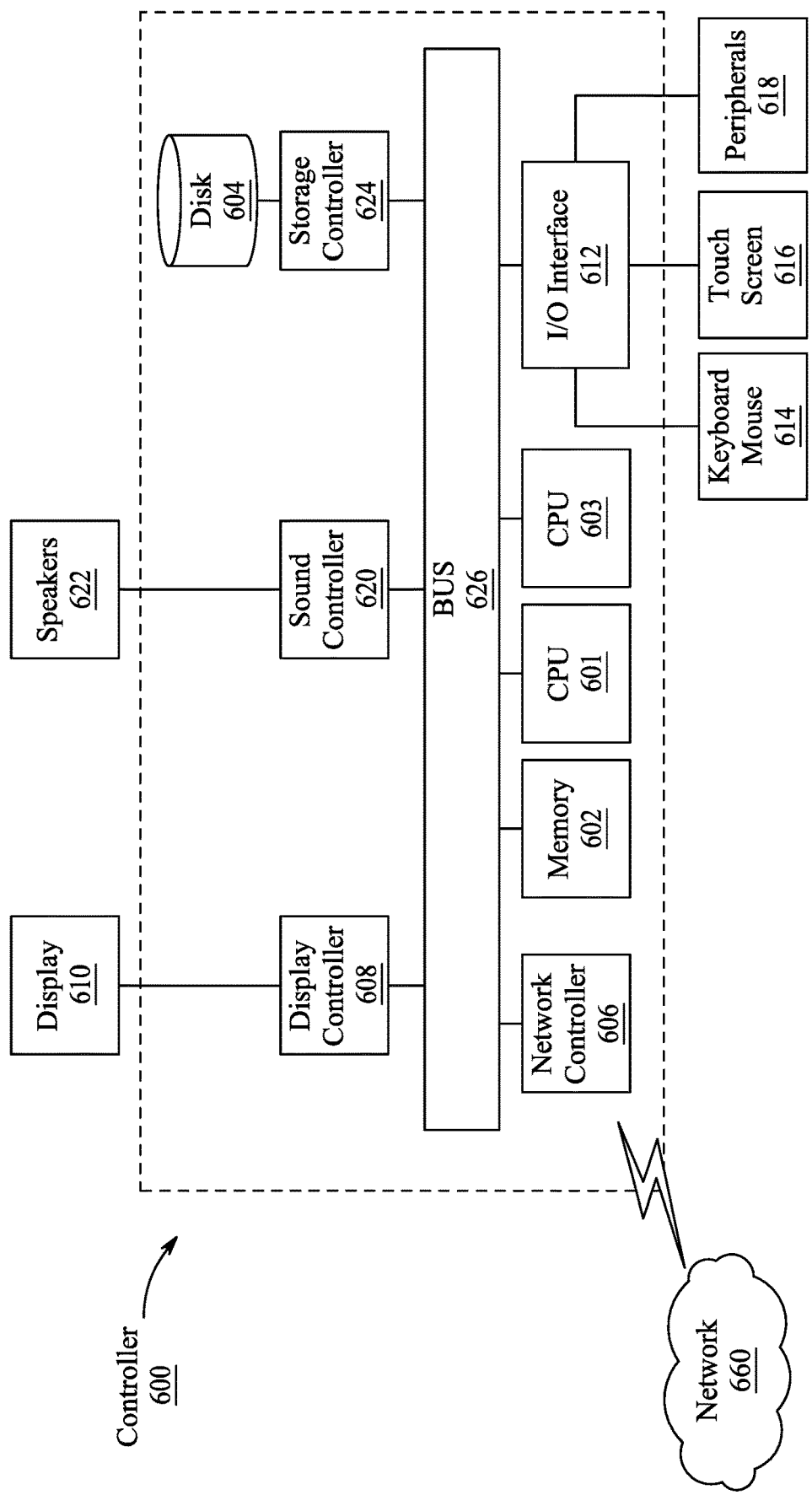
FIG. 6 is an illustration of a non-limiting example of details of computing hardware used in the computing system, according to certain embodiments.

Next, further details of the hardware description of the computing environment of FIG. 1G according to exemplary embodiments is described with reference to FIG. 6. In FIG. 6, a controller 600 is described as representative of the system 150 of FIG. 1G in which the compensator 114 is a computing device that includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 6, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skilled in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN sub-networks. The network 660 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 617. General purpose I/O interface also connects to a variety of peripherals 617 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general-purpose storage controller 624 connects the storage medium disk 604 with communication bus 626, which may be an ISA, EISA, VESA, PCI, or similar, for interconnecting all of the components of the computing device. A description of the general features and functionality of the display 618, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Figure 7:
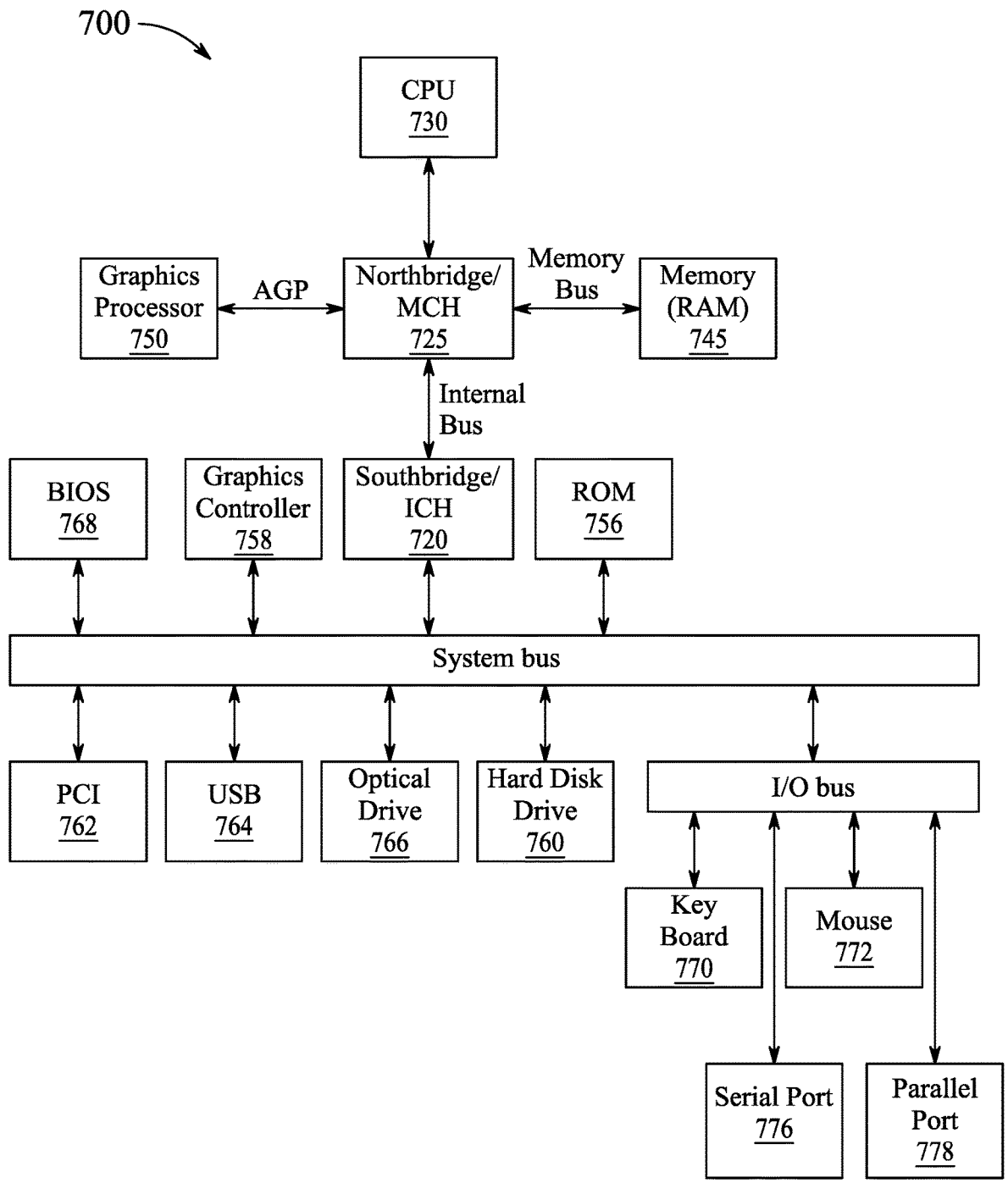
FIG. 7 is an exemplary schematic diagram of a data processing system used within the computing system, according to certain embodiments.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
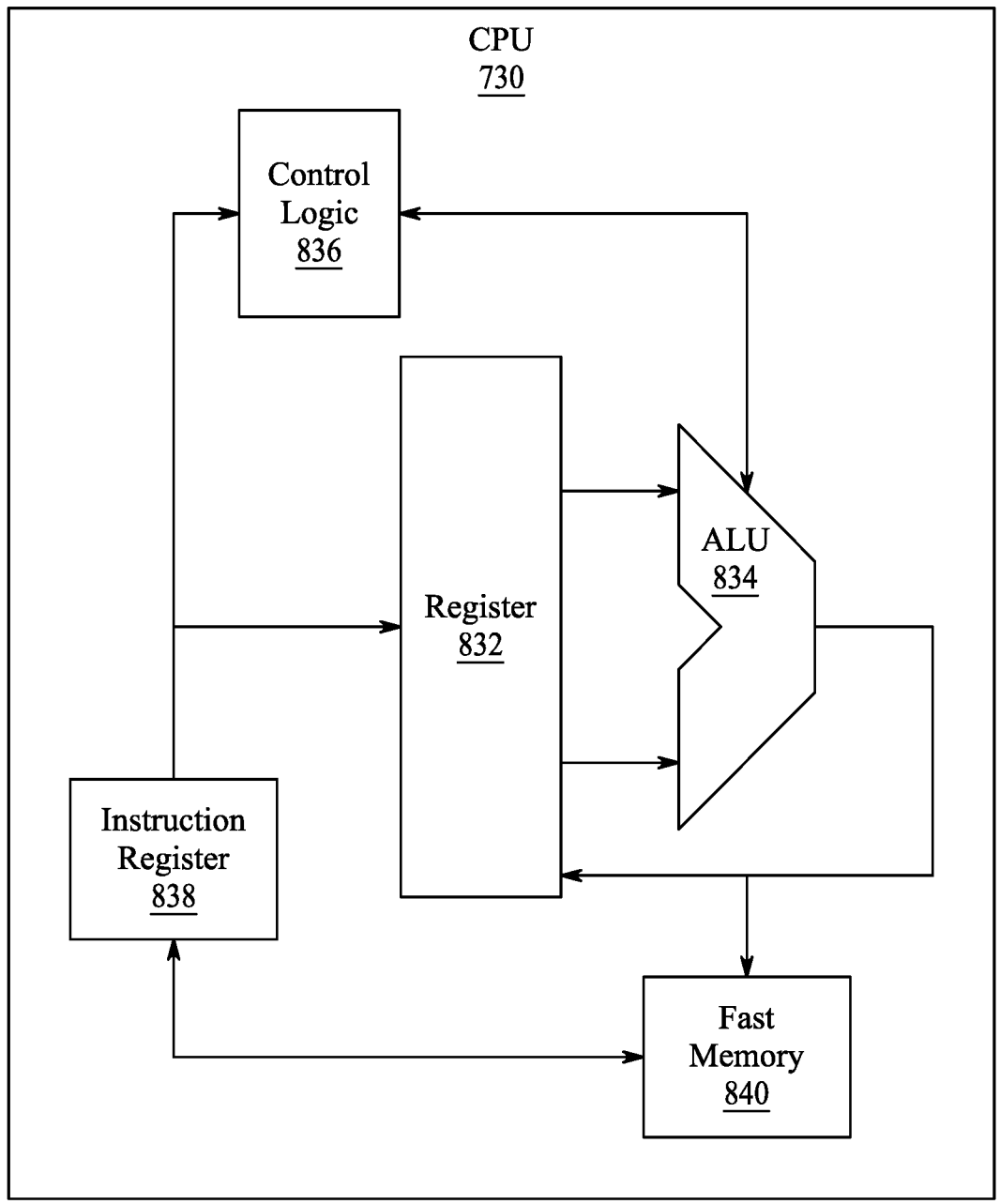
FIG. 8 is an exemplary schematic diagram of a processor used with the computing system, according to certain embodiments.

For example, FIG. 8 shows one implementation of CPU 730. In one implementation, the instruction register 838 retrieves instructions from the fast memory 840. At least part of these instructions is fetched from the instruction register 838 by the control logic 836 and interpreted according to the instruction set architecture of the CPU 730. Part of the instructions can also be directed to the register 832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 788 through a PCI bus 762.

The PCI devices may include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, a LPC bridge, SMBus, a DMA controller, and an Audio Codec.

Figure 9:
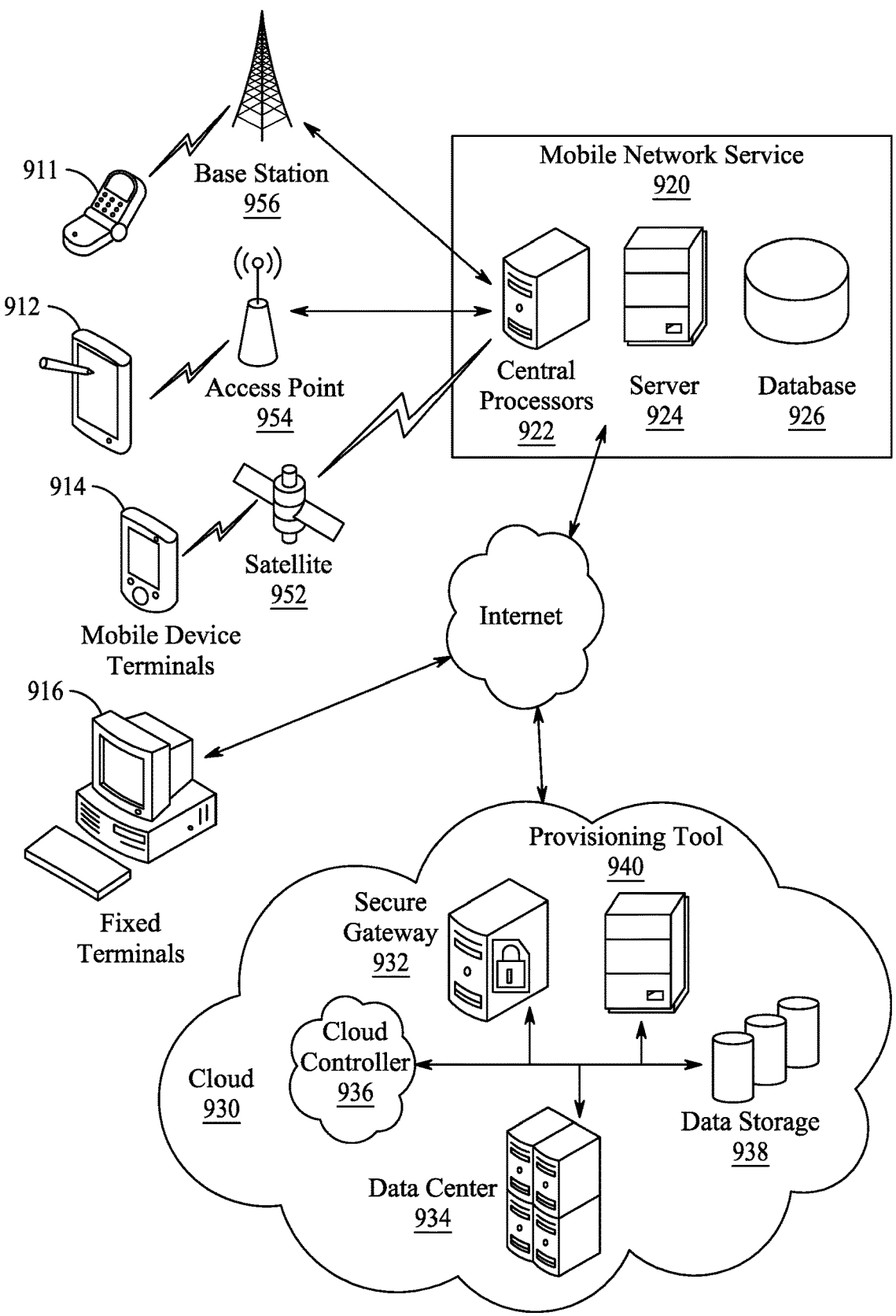
FIG. 9 is an illustration of a non-limiting example of distributed components that may share processing with the controller, according to certain embodiments.

The functions and features described herein may also be executed by various distributed components of a system. For example, one or more processors may execute these system functions, where the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 9 illustrates client devices including smart phone 919, tablet 912, mobile device terminal 914 and fixed terminals 916. These client devices may be commutatively coupled with a mobile network service 919 via base station 956, access point 954, satellite 952 or via an internet connection. Mobile network service 919 may comprise central processors 922, a server 924 and database 923. Fixed terminals 916 and mobile network service 920 may be commutatively coupled via an internet connection to functions in cloud 930 that may comprise a security gateway 932, a data center 934, a cloud controller 936, a data storage 938 and a provisioning tool 940.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended backup load to be powered.

The above-described hardware description is a non-limiting example of corresponding structure for performing the functionality described herein. Obviously, numerous modifications and variations of the present disclosure will be apparent to the person skilled in the art in light of the above description. It is therefore to be understood that within the scope of the appended claims, the disclosure may be practiced otherwise than as specifically described herein.

The invention claimed is:

1. A system for decentralized control of decoupled plants, comprising:

N decoupled plants, wherein each decoupled plant includes at least a motor and a load;

N controllers, wherein a controller is connected in series with a decoupled plant;

wherein each controller$_i$, for i=1, 2, ..., N, includes:

an adder, $A_i$, having a first input configured receive a set point signal, $SP_i$, wherein the set point signal has a frequency, $\omega_i$, a second input configured to receive a negative feedback signal from at a respective plant output, $PO_i$, wherein the adder is configured to add the set point signal, $SP_i$, to the negative feedback signal, and generate an error signal, $E_i$;

a controller interface configured to receive a set of L tuning parameters;

a controller circuitry including a non-transitory computer readable medium including program instructions and one or more processors configured to use the program instructions to modify the error signal, a frequency domain assessment function, $Q(\omega,A)$ and a set of L tuning parameters and generate drive signals which actuate the motor, operate the load and generate the plant output, $PO_i$;

a compensator connected to the decoupled plants, wherein the compensator is configured to:

sample the error signals, $E_i$, and the plant outputs, $PO_i$;

perform a Fourier transform of the error signals, $E_i$, to transform the error signals, $E_i$, to a frequency domain;

generate the tuning parameter space vector, A, given by $\Lambda = [\gamma_1 \gamma_2 \ldots \gamma_L]T$, where $\gamma_i$ represents an $i^{th}$ tuning parameter and T represents a transpose, based on a frequency domain assessment function, $Q(\omega,A)$, where $Q(\omega,A)$ is a subset of an admissible region, $\Psi$, in the frequency domain;

obtain the set of L tuning parameters from the tuning parameter space vector, $\Lambda$; and transmit the frequency domain assessment function, $Q(\omega,A)$ and the set of L tuning parameters to each controller interface of each plant, wherein the compensator is connected to the compensator interface, the compensator including computing circuitry, one or more processors, H, and a non-transitory computer readable medium configured to store program instructions that, when executed by the one or more processors, H, cause the processors to perform a Fourier transform of the error signals, $E_s$, to transform the error signals, $E_s$, to the frequency domain; and wherein the compensator is further configured to:

determine a virtual action, F, which populates a virtual region, $\Gamma$, in a complex plane, C, of the frequency domain having a set of points, P, where the virtual region $\Gamma=(C-\Psi)$, wherein the virtual action, F, maps each point, P, in the complex plane to a force, F(P), such that $C \rightarrow R^2$, where $F(P)=[F_r(P),F_I(P)]^T$, where $R^2$ is a two-dimensional real number plane, and $F_r$ and $F_I$ are real and imaginary components of F, respectively, wherein the force, F(P), is configured to drive any point, P, in the virtual region, $\Gamma$, to a point in the admissible region, $\Psi$, and where the virtual action, F, is zero in the admissible region, $\Psi$.

2. The system of claim 1, wherein the compensator further includes:

a system adder, $A_s$, configured to receive the set point signals, $SP_i$, from each plant, for each i=1 to N, subtract a system output and generate system error signals, $E_s$.

3. The system of claim 2, further comprising:

a compensator interface configured to:

receive the system error signals, $E_s$;

receive a set of initial values of the L tuning parameters; and receive the frequency domain assessment function, $Q(\omega,A)$, for all $\omega$.

4. The system of claim 1, wherein the compensator is further configured to:

generate a sampling frequency vector, $\Omega$, where $\Omega=[\omega_1, \omega_2, \ldots, \omega_N]^T$;

apply the sampling frequency vector, $\Omega$, to the force, F(P);

generate a force vector, $F(\Omega)$;

determine that the compensator is in compliance with a set of constraints when $|F(\Omega)|=0$; and determine that the compensator is not in compliance with the set of constraints when $|F(\Omega)|>0$.

5. The system of claim 4, wherein the compensator is further configured to:

when in compliance with the set of constraints, generate an L-dimensional state space, $A(\mathcal{L})$, having coordinates equal to each coordinate of the tuning parameter space vector, $\Lambda$; and generate an L-dimensional image subspace, $\mathcal{F}(\Lambda)$, based on the L-dimensional state space, $\Lambda(\mathcal{L})$.

6. The system of claim 5, wherein the compensator is further configured to:

construct an extended Jacobian matrix, $J_\Omega(\Omega)$, at each sampling frequency;

construct a complete orthonormal set of vectors tangent to $\mathcal{F}(\Lambda)$ from each column of the extended Jacobian matrix, $J_\Omega(\omega)$;

project the force vector, $F(\Omega)$, on $\mathcal{F}_A$, such that $\mathcal{F}_A = J_\Omega^T (\Omega) F_\Omega(\Omega)$.

7. The system of claim 6, wherein the compensator is further configured to:

calculate $\dot{\Lambda} = J_\Omega^T(Q(\Omega,\Lambda)))F_\Omega(Q(\Omega,\Lambda)$ for $\Lambda(0)=\Lambda_0$, wherein $\dot{\Lambda}$ is a change in the tuning parameter space vector, $\Lambda$; and integrate $\dot{\Lambda}$ to obtain the tuning parameter space vector, $\lambda$.

8. A method for determining controller tuning parameters for a system of decoupled plant controllers, comprising, for each decoupled plant controller:

receiving, by a first input of an adder, $A_i$, in series with a plant controller, $CT_i$, for i=1, 2, ..., N, a set point signal, $SP_i$, wherein the set point signal has a frequency, $\omega_i$;

receiving, by a second input of the adder, a negative feedback signal of a plant output, $PO_i$;

adding, by the adder, $A_i$, the set point signal, $SP_i$, to the negative feedback signal and generating an error signal, $E_i$;

receiving, at an interface of each controller, $CT_i$, a set of L tuning parameters;

receiving, at the interface of each controller, $CT_i$, a frequency domain assessment function, $Q(\omega, A)$;

performing, by a controller circuitry located in each controller, $CT_i$, the controller circuitry including a non-transitory computer readable medium, $CRM_i$, including program instructions, $PI_i$, and one or more processors, $PR_i$, configured to use the program instructions, the steps of:

modifying the error signal, $E_i$, based on the tuning parameter space vector, $\Lambda$;
generating drive signals;
transmitting the drive signals to a plant, $B_i$, connected in series with the controller, $CT_i$;
actuating, with the drive signals, a motor, $G_i$, located within the plant, $B_i$;
operating, by the motor, $G_i$, a load, $D_i$; and
generating the plant output, $PO_i$;
sampling, by an adder, $A_s$, connected to the system of decoupled plant controllers, the set point signals, $SP_i$, from each plant, for each i=1 to N, and the plant outputs, $PO_i$;
performing, by a compensator connected to the adder, $A_s$, a Fourier transform of the set point signals, $SP_i$, which transforms the set point signals, $SP_i$, to a frequency domain;
receiving, by a compensator interface of the compensator, a frequency domain assessment function, $Q(\omega, \Lambda)$, where $Q(\omega, \Lambda)$ is a subset of an admissible region, $\Psi$, in the frequency domain;
generating, by the compensator, a tuning parameter space vector, $\Lambda$, given by $\Lambda=[\gamma_1\ \gamma_2\ \ldots\ \gamma_L]^T$, where $\gamma_i$, represents an ith tuning parameter and T represents a transpose, based on the frequency domain assessment function, $Q(\omega, \Lambda)$, where $Q(\omega, \Lambda)$;
obtaining the L tuning parameters from the tuning parameter space vector, $\Lambda$; and
transmitting, by a transmitter connected to the compensator, the frequency domain assessment function, $Q(\omega, \Lambda)$ and the L tuning parameters to each controller interface of each controller, $CT_i$, of the system of decoupled plant controllers,
during a sampling period, receiving, at a first input of the adder, As, the set point signals, $SP_i$, from each plant, for each i=1 to N;
receiving, at a second input of the adder, $A_s$, the plant output signals, $PO_i$; and
generating, at an output of the adder, $A_s$, system error signals, $E_g$;
receiving, by the compensator interface: the system error signals, $E_s$, a set of initial values of the L tuning parameters, and the frequency domain assessment function, $Q(\omega, \Lambda)$, for all $\omega$;
performing, by the compensator, wherein the compensator includes computing circuitry, one or more processors, H, and a non-transitory computer readable medium, CRM configured to store program instructions, $PI_s$, that, when executed by the one or more processors, H, a Fourier transform of the error signals, $E_s$, to transform the error signals, $E_s$, to the frequency domain; and
determining, by the compensator, a virtual action, F, which populates a virtual region, $\Gamma$, in a complex plane, C, of the frequency domain having a set of points, P, where the virtual region $\Gamma=(C-\Psi)$, wherein the virtual action, F, maps each point, P, in the complex plane to a force, F(P), such that $C \rightarrow R^2$, where $F(P)=[F_r(P)\ F_I(P)]^T$, where $R_2$ is a two-dimensional real number plane, and $F_r$ and $F_I$ are real and imaginary components of F, respectively, wherein the force, F(P), is configured to drive any point, P, in the virtual region, $\Gamma$, to a point in the admissible region, $\Psi$, and where the virtual action, F, is zero in the admissible region, $\Psi$.

9. The method of claim 8, further comprising:
generating, by the compensator, a sampling frequency vector, $\Omega$, where $\Omega=[\omega_1, \omega_2, \ldots, \omega_N]^T$;

apply, by the compensator, the sampling frequency vector, $\Omega$, to the force, F(P);
generating, by the compensator, a force vector, $F(\Omega)$;
determining that the compensator is in compliance with a set of constraints when $|F(\Omega)|=0$; and
determining that the compensator is not in compliance with the set of constraints when $|F(\Omega)|>0$.

10. The method of claim 9, further comprising:
when the compensator is in compliance with the set of constraints, generating an L-dimensional state space, $\Lambda(\mathcal{L})$, having coordinates equal to each coordinate of the tuning parameter space vector, $\Lambda$; and
generating an L-dimensional image subspace, $\mathcal{F}(\Lambda)$, based on the L-dimensional state space, $\Lambda(\mathcal{L})$.

11. The method of claim 10, further comprising:
constructing, by the compensator, an extended Jacobian matrix, $J_\Omega(\Omega)$, at each sampling frequency;
constructing, by the compensator, a complete orthonormal set of vectors tangent to $\mathcal{F}(\Lambda)$ from each column of the extended Jacobian matrix, $J_\Omega(\Omega)$;
projecting, by the compensator, the force vector, $F(\Omega)$, on $\mathcal{F}_\Lambda$, such that $\mathcal{F}_\Lambda = J_\Omega^T(\Omega)\ F_\Omega(\Omega)$.

12. The method of claim 11, further comprising:
calculating $\dot{\Lambda}=J_\Omega^T(Q(\Omega,\Lambda)))F_\Omega(Q(\Omega,\Lambda)$ for $\Lambda(0)=\Lambda_0$, wherein $\dot{\Lambda}$ is a change in the tuning parameter space vector, $\Lambda$; and
integrating $\dot{\Lambda}$ to obtain the tuning parameter space vector, $\Lambda$.

13. A non-transitory computer readable medium having instructions stored therein that, when executed by one or more processors of a compensator, cause the one or more processors to perform a method of determining controller tuning parameters for a system of decoupled plant controllers each connected to a plant, comprising:
sampling, by an adder, $A_s$, connected to the system of decoupled plant controllers, a set point signals, $SP_i$, from each plant and a set of plant outputs, $PO_i$, for each i=1 to N;
performing a Fourier transform of the set point signals, $SP_i$, which transforms the set point signals, $SP_i$, to a frequency domain;
receiving, at a compensator interface, a frequency domain assessment function, $Q(\omega), \Lambda)$, where $Q(\omega, \Lambda)$ is a subset of an admissible region, $\Psi$, in the frequency domain;
generating a tuning parameter space vector, $\Lambda$, given by $\Lambda=[\gamma_1\ \gamma_2\ \ldots\ \gamma_L]^T$, where $\gamma_i$ represents an $i^{th}$ tuning parameter and T represents a transpose, based on the frequency domain assessment function, $Q(\omega, \Lambda)$, where $Q(\omega, \Lambda)$;
obtaining the L tuning parameters from the tuning parameter space vector, $\Lambda$,
transmitting, by a transmitter connected to the compensator, the frequency domain assessment function, $Q(\omega, \Lambda)$ and the L tuning parameters to each controller of the system of decoupled plant controllers; and
wherein each controller of the system of decoupled plant controllers is configured for:
receiving the frequency domain assessment function, $Q(\omega, \Lambda)$ and the L tuning parameters;
modifying a feedback error signal based on the tuning parameter space vector, $\Lambda$;
generating drive signals based on the frequency domain assessment function, $Q(\omega, \Lambda)$ and the L tuning parameters for
transmitting the drive signals to a plant connected in series with the controller;

actuating, with the drive signals, a motor located within the plant;

operating, by the motor, a load;

generating the plant output, $PO_i$;

determining a virtual action, F, which populates a virtual region, $\Gamma$, in a complex plane, C, of the frequency domain having a set of points, P, where the virtual region $\Gamma=(C-\Psi)$, wherein the virtual action, F, maps each point, P, in the complex plane to a force, F(P), such that $C \rightarrow R^2$, where $F(P)=[F_r(P)\ F_I(P)]^T$, where $R^2$ is a two-dimensional real number plane, and $F_r$ and $F_I$ are real and imaginary components of F, respectively, wherein the force, F(P), is configured to drive any point, P, in the virtual region, $\Gamma$, to a point in the admissible region, $\Psi$, and where the virtual action, F, is zero in the admissible region, ;

generating, by the compensator, a sampling frequency vector, $\Omega$, where $\Omega=[\omega_1, \omega_2, \omega_N]^T$;

apply, by the compensator, the sampling frequency vector, $\Omega$, to the force, F(P);

generating, by the compensator, a force vector, $F(\Omega)$;

determining that the compensator is in compliance with a set of constraints when $|F(\Omega)|=0$;

determining that the compensator is not in compliance with the set of constraints when $|F(\Omega)|>0$;

when the compensator is in compliance with the set of constraints, generating an L-dimensional state space, $\Lambda(\mathcal{L})$, having coordinates equal to each coordinate of the tuning parameter space vector, $\Lambda$;

generating an L-dimensional image subspace, $\underline{\mathcal{F}}(\Lambda)$, based on the L-dimensional state space, $\Lambda(\mathcal{L})$;

constructing, by the compensator, an extended Jacobian matrix, $J_\Omega(\Omega)$, at each sampling frequency;

constructing, by the compensator, a complete orthonormal set of vectors tangent to $\underline{\mathcal{F}}(\Lambda)$ from each column of the extended Jacobian matrix, $J_\Omega(\Omega)$;

projecting, by the compensator, the force vector, $F(\Omega)$, on $\underline{\mathcal{F}}_\Lambda$, such that $\underline{\mathcal{F}}_\Lambda = I_\Omega^T(\Omega)\ F_\Omega(\Omega)$;

calculating $\dot{\Lambda}=J_\Omega^T(Q(\Omega,\Lambda)))F_\Omega(Q(\Omega,\Lambda)$ for $\Lambda(0)=\Lambda_0$, wherein $\dot{\Lambda}$ is a change in the tuning parameter space vector, $\Lambda$; and integrating $\dot{\Lambda}$ to obtain the tuning parameter space vector, $\Lambda$.

* * * * *